United States Patent
Yamaguchi et al.

(10) Patent No.: US 10,167,791 B2
(45) Date of Patent: Jan. 1, 2019

(54) CONTROL APPARATUS FOR NATURALLY ASPIRATED GASOLINE ENGINE

(71) Applicant: Toyota Jidosha Kabushiki Kaisha, Toyota-shi, Aichi-ken (JP)

(72) Inventors: Yuji Yamaguchi, Susono (JP); Hirokazu Ito, Susono (JP); Yuji Miyoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 86 days.

(21) Appl. No.: 15/613,632

(22) Filed: Jun. 5, 2017

(65) Prior Publication Data

US 2017/0356361 A1 Dec. 14, 2017

(30) Foreign Application Priority Data

Jun. 14, 2016 (JP) .................... 2016-117926

(51) Int. Cl.
*B01D 53/94* (2006.01)
*F01N 3/10* (2006.01)
(Continued)

(52) U.S. Cl.
CPC ....... *F02D 41/0055* (2013.01); *B01D 53/944* (2013.01); *B01D 53/9445* (2013.01); *B01D 53/9495* (2013.01); *F01N 3/101* (2013.01); *F02D 9/08* (2013.01); *F02D 41/0002* (2013.01); *F02D 41/0005* (2013.01);
(Continued)

(58) Field of Classification Search
CPC .............. B01D 53/944; B01D 53/9445; B01D 53/9495; B01D 2258/014; F01N 3/101; F02D 41/0002; F02D 41/0005; F02D 41/0055; F02D 41/0235; F02D 41/123; F02D 41/26; F02D 9/08; F02D 2041/0017; F02D 2200/0804; F02D 41/126; F02M 26/17; F02P 5/045; F02P 5/1504; F02P 9/002; Y02T 10/22; Y02T 10/42

See application file for complete search history.

(56) References Cited

U.S. PATENT DOCUMENTS

2008/0295514 A1  12/2008 Ono
2017/0082039 A1  3/2017 Sugimoto

FOREIGN PATENT DOCUMENTS

JP  H07166904 A  6/1995
JP  2005-264927 A  9/2005
(Continued)

*Primary Examiner* — Brandon D Lee
(74) *Attorney, Agent, or Firm* — Dinsmore & Shohl LLP

(57) ABSTRACT

This disclosure is intended to suppress a noble metal supported by a three-way catalyst from being deteriorated by oxidation with the execution of fuel cut processing in a suitable manner. A control apparatus for a naturally aspirated gasoline engine is provided with a three-way catalyst, a first throttle valve, a second throttle valve arranged in the intake passage at the downstream side of the first throttle valve, an EGR valve, and a controller. When the controller carries out fuel cut processing and the temperature of the three-way catalyst is equal to or higher than a predetermined temperature, the controller introduces the EGR gas into a cylinder of the gasoline engine as intake air by fully closing the first throttle valve and by opening the EGR valve, and further controls an amount of the EGR gas by adjusting the degree of opening of the second throttle valve.

6 Claims, 11 Drawing Sheets

(51) Int. Cl.
*F02D 41/00* (2006.01)
*F02D 41/02* (2006.01)
*F02D 41/26* (2006.01)
*F02D 9/08* (2006.01)
*F02M 26/17* (2016.01)
*F02P 5/04* (2006.01)
*F02D 41/12* (2006.01)
*F02P 5/15* (2006.01)
*F02P 9/00* (2006.01)

(52) U.S. Cl.
CPC ....... *F02D 41/0235* (2013.01); *F02D 41/123* (2013.01); *F02D 41/26* (2013.01); *F02M 26/17* (2016.02); *F02P 5/045* (2013.01); *B01D 2258/014* (2013.01); *F02D 41/126* (2013.01); *F02D 2041/0017* (2013.01); *F02D 2200/0804* (2013.01); *F02P 5/1504* (2013.01); *F02P 9/002* (2013.01); *Y02T 10/22* (2013.01); *Y02T 10/42* (2013.01)

(56) References Cited

FOREIGN PATENT DOCUMENTS

| | | |
|---|---|---|
| JP | 2007-198277 A | 8/2007 |
| JP | 2015-175357 A | 10/2015 |

[Fig. 1]
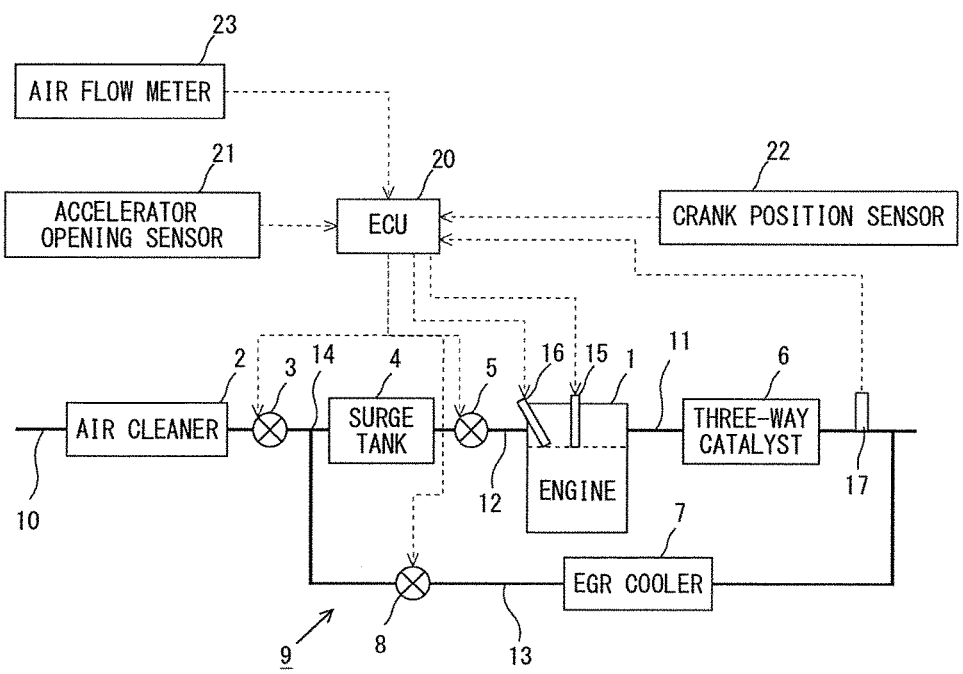

[Fig. 2]
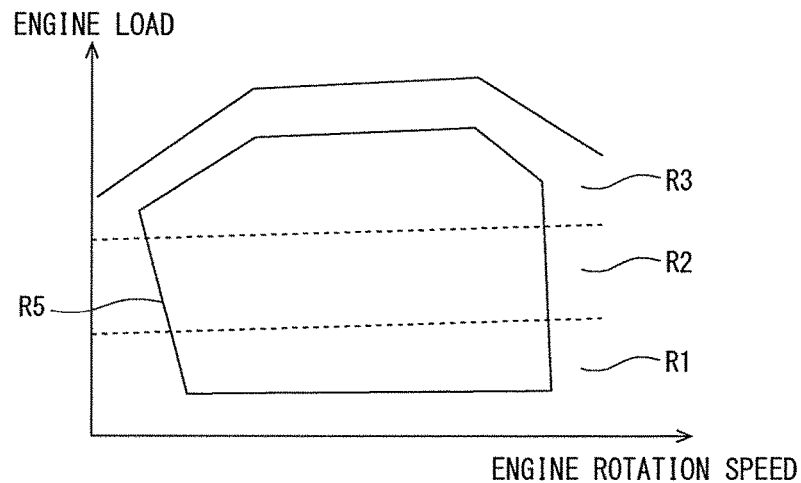
[Fig. 3]
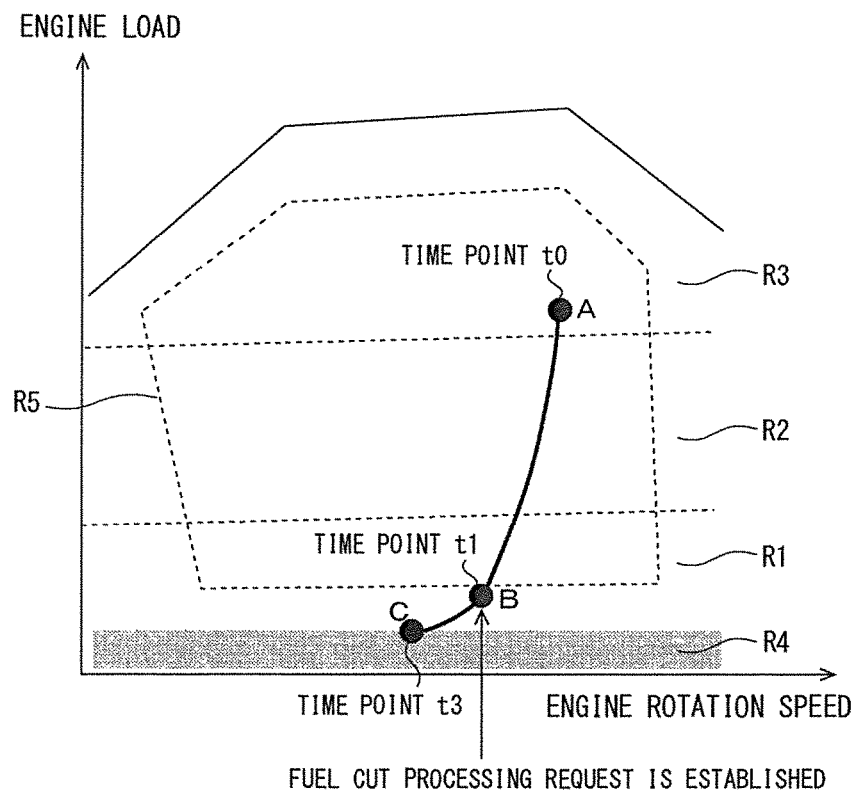

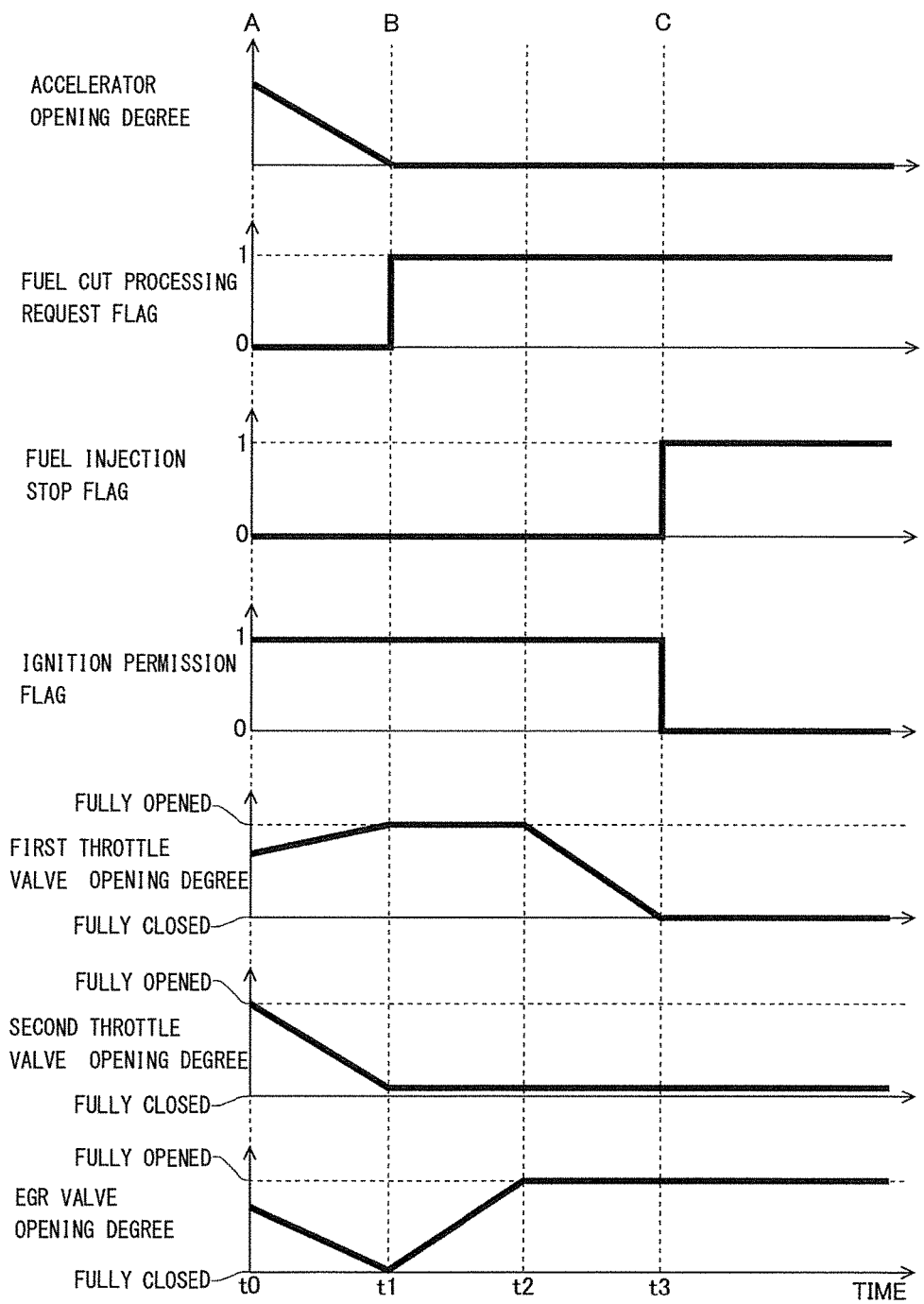

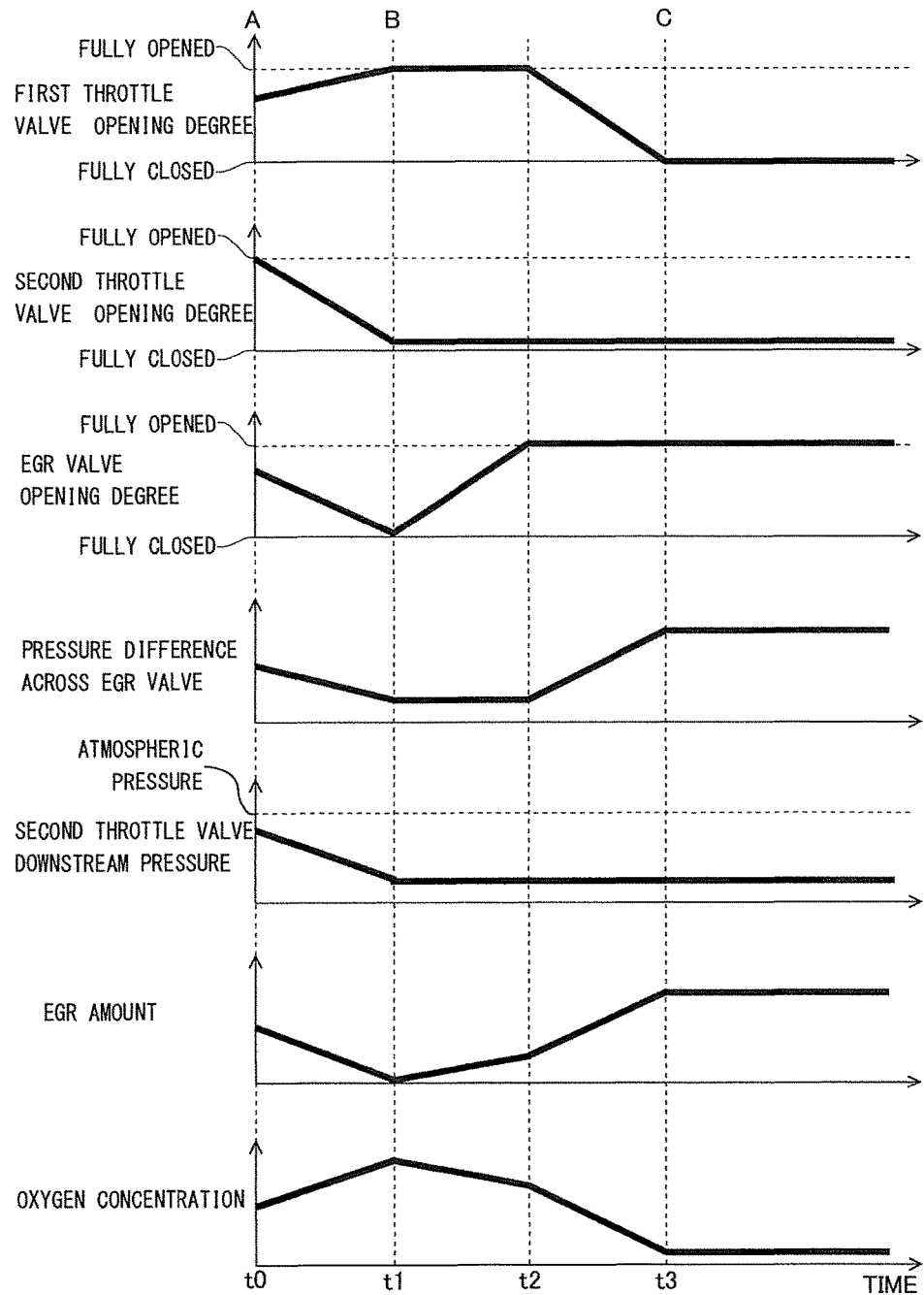
[Fig. 4B]

[Fig. 5]
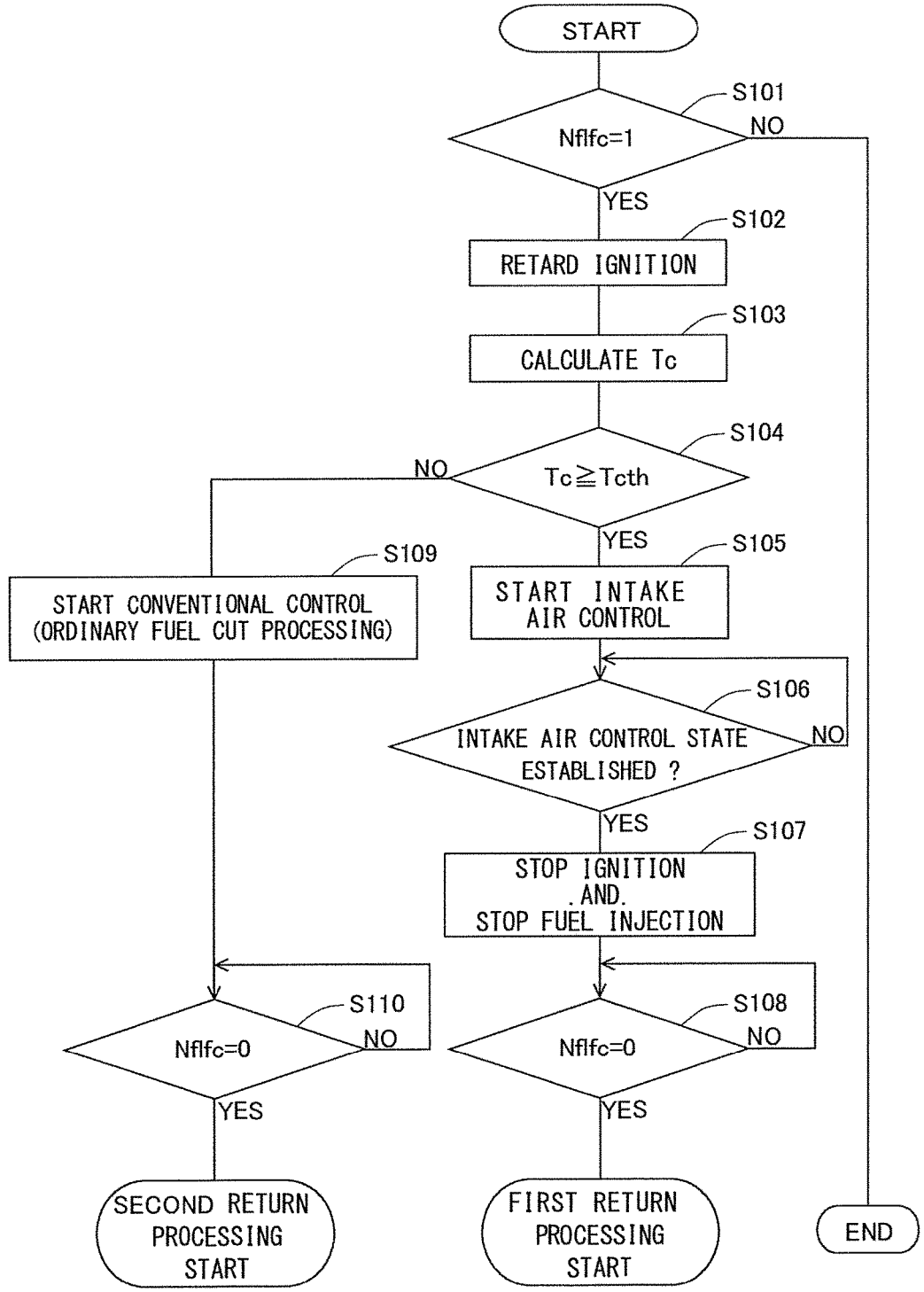

[Fig. 6]
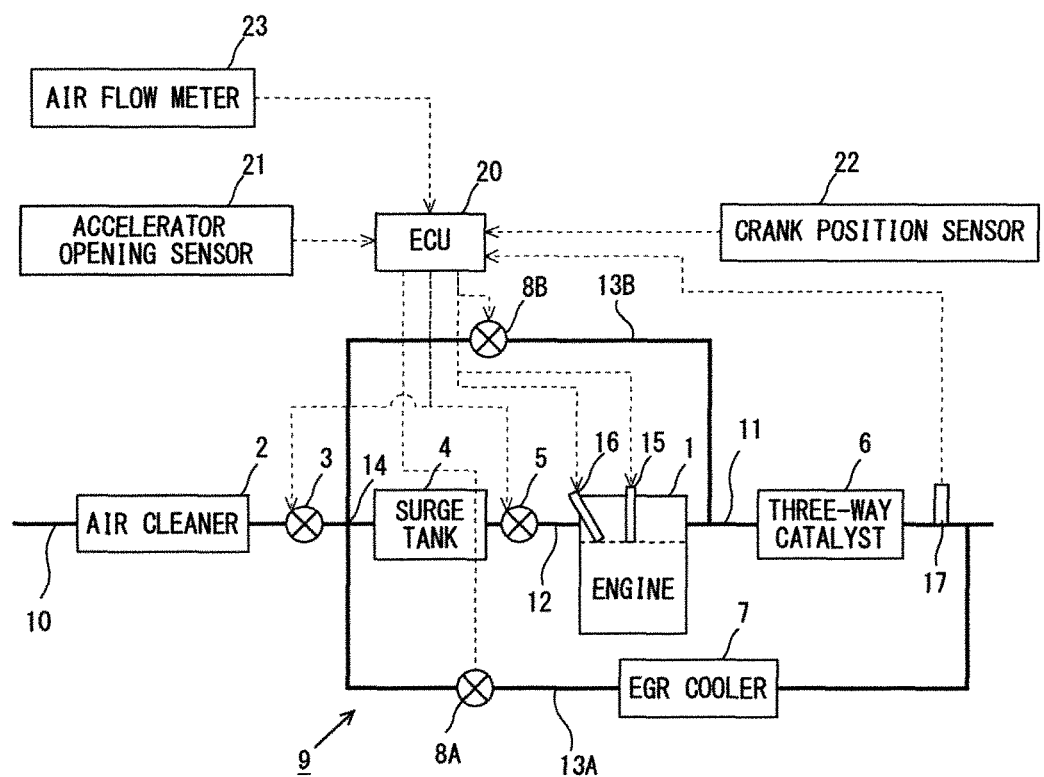

[Fig. 7]
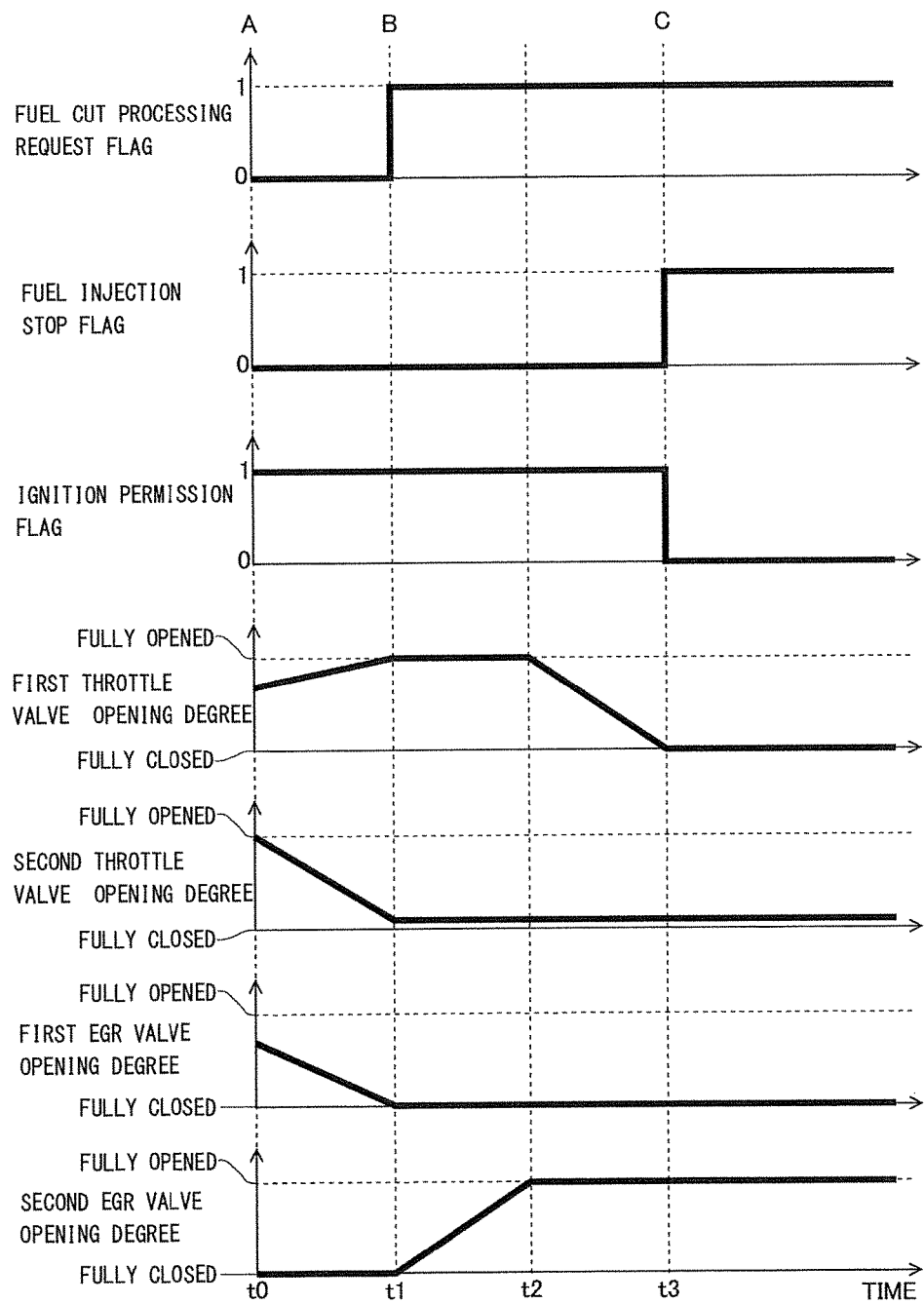

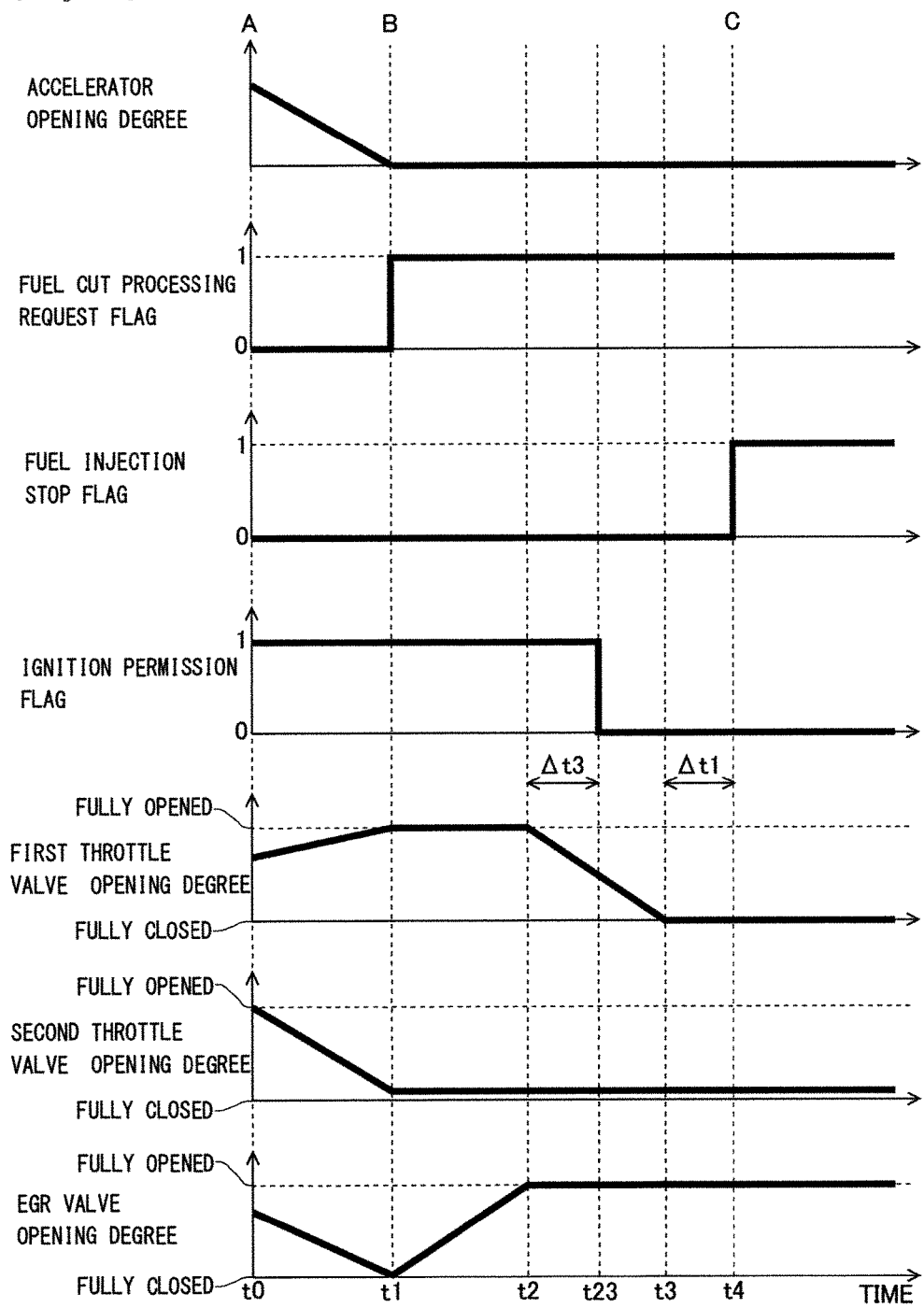
[Fig. 8]

[Fig. 9]
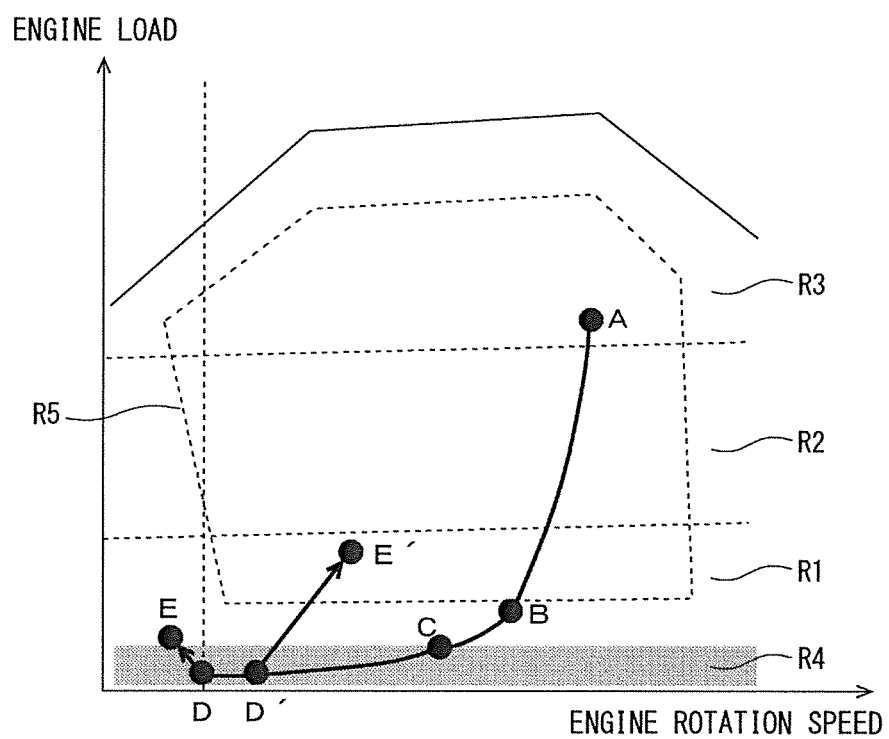

[Fig. 10]
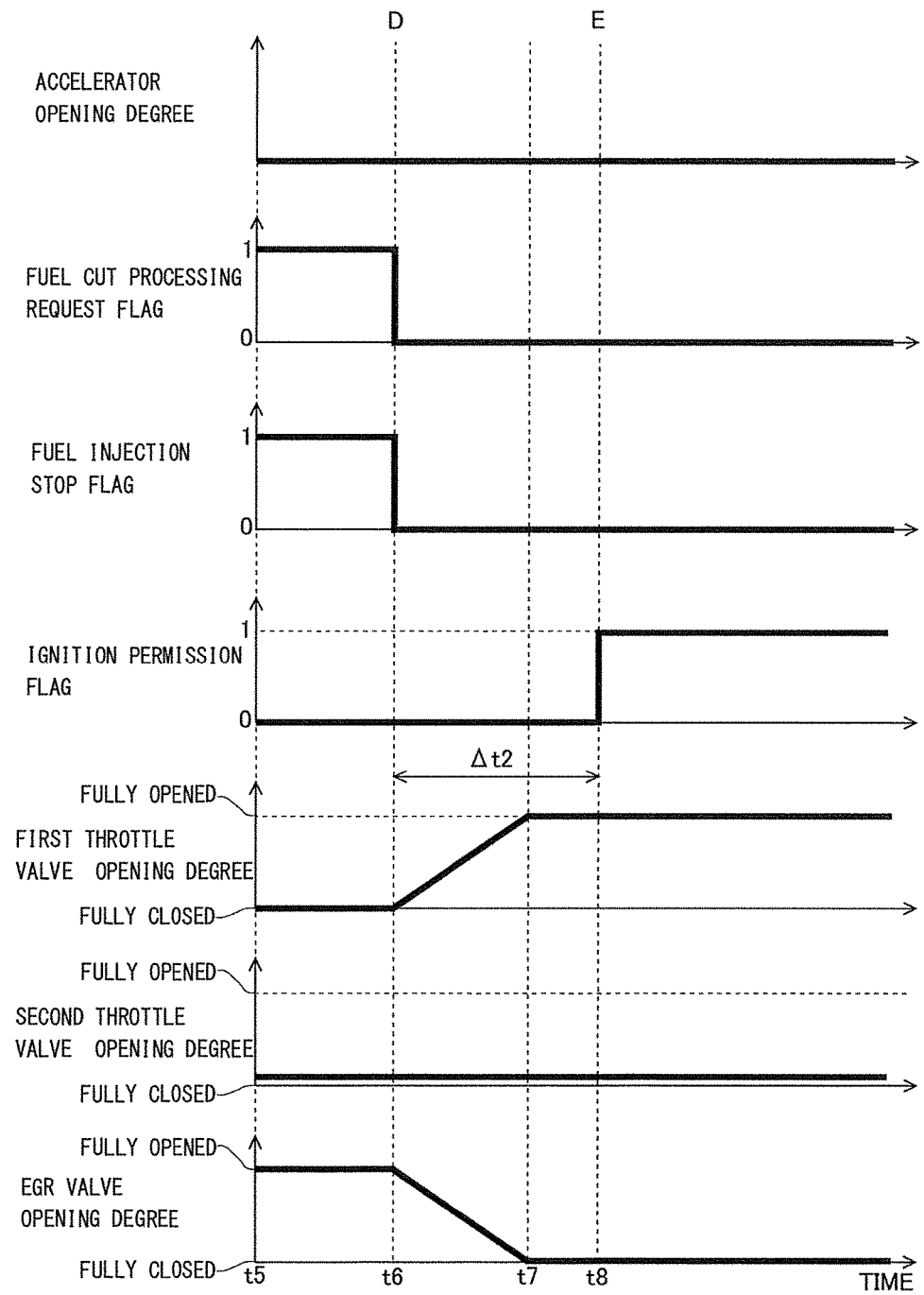

[Fig. 11]
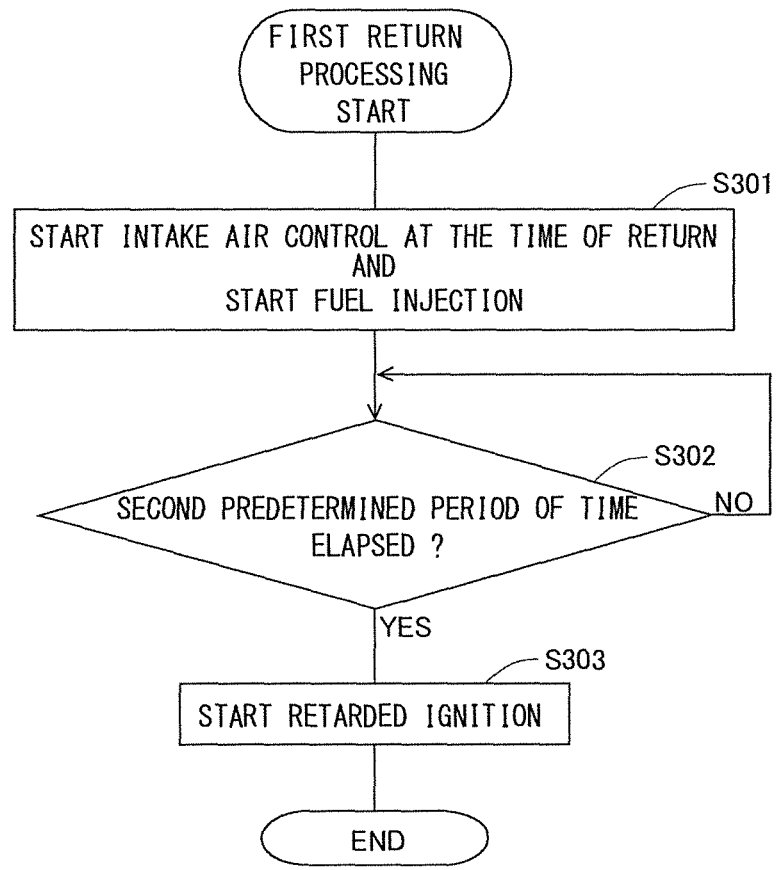

CONTROL APPARATUS FOR NATURALLY ASPIRATED GASOLINE ENGINE

CROSS-REFERENCE TO RELATED APPLICATIONS

This application claims priority to Japanese Patent Application No. 2016-117926 filed on Jun. 14, 2016, the entire contents of which are incorporated by reference.

BACKGROUND

Technical Field

The present disclosure relates to a control apparatus for a naturally aspirated gasoline engine provided with an EGR device.

Description of the Related Art

In naturally aspirated gasoline engines, there is known a technology in which an EGR device is provided for recirculating an EGR gas, which is a part of exhaust gas, from an exhaust passage to an intake passage, so that the EGR gas is recirculated to the intake passage at a location downstream of a throttle valve (see, for example, Japanese Patent Application Laid-Open No. 2015-175357). With such an arrangement, the EGR gas will be recirculated under the influence of a negative pressure in the intake passage generated by the throttling of the throttle valve.

In addition, in the naturally aspirated gasoline engines, it is also known that a three-way catalyst including a noble metal such as platinum (Pt), etc., supported thereon is used for an exhaust gas purification catalyst.

SUMMARY

At the time of deceleration of a vehicle on which a naturally aspirated gasoline engine is mounted, when so-called fuel cut processing is carried out in which the fuel injection of a fuel injection valve is stopped and the ignition of a spark plug is stopped during the operation of the naturally aspirated gasoline engine, fresh air will pass through the interior of a cylinder, and will flow into a three-way catalyst. In this case, a noble metal supported by the three-way catalyst will contact the oxygen contained in the fresh air. Then, when the fuel cut processing is carried out in a state where the temperature of the three-way catalyst is high, there is a fear that the noble metal supported by the three-way catalyst will be deteriorated by oxidation.

Then, when the noble metal supported by the three-way catalyst is deteriorated by oxidation, the exhaust gas purification ability or performance of the three-way catalyst will drop, as a result of which in the case where the fuel cut processing is carried out in the state where the temperature of the three-way catalyst is high, it is desirable to suppress the amount of oxygen flowing into the three-way catalyst as much as possible.

Here, when the amount of fresh air to be introduced into the cylinder is decreased to a large extent by using a conventional technology, i.e., by increasing the throttling of the throttle valve, in order to suppress the deterioration of the noble metal by oxidation as mentioned above, a relatively large negative pressure becomes easy to occur in the cylinder, and so-called oil rise (i.e., oil loss via the piston ring) becomes easy to occur in which lubricating oil of the naturally aspirated gasoline engine enters the interior (combustion chamber) of the cylinder. In addition, when the conventional technology is used, for example, to increase the amount of recirculation of the EGR gas, in order to suppress the deterioration of the noble metal by oxidation as mentioned above, the pumping loss of the naturally aspirated gasoline engine becomes small, and it becomes difficult to obtain a feeling of deceleration of the vehicle. Thus, with the conventional technology, it is difficult to suppress the deterioration of the noble metal by oxidation in a suitable manner.

The present disclosure has been made in view of the problems as mentioned above, and has for its object to suppress a noble metal supported by a three-way catalyst from being deteriorated by oxidation with the execution of fuel cut processing in a suitable manner in a naturally aspirated gasoline engine.

Solution to Problem

In order to solve the aforementioned problem, according to the present disclosure, two throttle valves are arranged in an intake passage of a naturally aspirated gasoline engine, and a merge portion of an EGR gas in an EGR device is arranged in a portion of the intake passage between an upstream side throttle valve and a downstream side throttle valve. Then, by controlling the degree of opening of each throttle valve and the degree of opening of an EGR valve of the EGR device during the execution of fuel cut processing to predetermined states, respectively, according to the temperature of a three-way catalyst, it is made possible to suppress the deterioration of a noble metal by oxidation in a suitable manner.

More specifically, the present disclosure resides in a control apparatus for a naturally aspirated gasoline engine which comprises: a three-way catalyst that is arranged in an exhaust passage of said gasoline engine; a first throttle valve that is arranged in an intake passage of said gasoline engine; a second throttle valve that is arranged in said intake passage at the downstream side of said first throttle valve; and an EGR device including an EGR passage that recirculates an EGR gas, which is a part of an exhaust gas discharged from said gasoline engine, to said intake passage between said first throttle valve and said second throttle valve, and an EGR valve that is arranged in said EGR passage; and a controller comprising at least one processor configured to carry out fuel cut processing, which is processing to stop ignition by a spark plug and fuel injection by a fuel injection valve during operation of said gasoline engine; wherein in cases where said controller carries out said fuel cut processing and where the temperature of said three-way catalyst is equal to or higher than a predetermined temperature, said controller may introduce said EGR gas into a cylinder of said gasoline engine as intake air by fully closing said first throttle valve and by opening said EGR valve, and may further control an amount of said EGR gas by adjusting the degree of opening of said second throttle valve.

In the naturally aspirated gasoline engine to which the control apparatus according to the present disclosure is applied, the EGR device is formed of the EGR passage and the EGR valve. Then, the first throttle valve and the second throttle valve are arranged in the intake passage in this order from the upstream side thereof, and further, the EGR passage through which the EGR gas flows merges or joins at an intake side to a portion of the intake passage between the first throttle valve and the second throttle valve (hereinafter, this may be referred to as an "interthrottle intake passage"). Accordingly, when the EGR gas arrives at the intake passage, it will be supplied into the cylinder through the second throttle valve. In addition, fresh air to be supplied into the cylinder from the intake passage at the upstream side of the first throttle valve is supplied into the cylinder through the first throttle valve and the second throttle valve.

Here, in said naturally aspirated gasoline engine, if the first throttle valve at the upstream side is fully opened in cases where the operating state of said naturally aspirated gasoline engine falls within a low load region (such a situation being referred to as "at the time of the low load region"), negative pressure becomes relatively small in the merge portion of the EGR passage and the intake passage, even at the time of the low load region. In such a case, a pressure difference between the upstream side (the exhaust passage side) and the downstream side (the intake passage side) of the EGR valve arranged in the EGR passage becomes small, and it becomes possible to control the amount of recirculation of the EGR gas by the adjustment of the EGR valve with a high degree of accuracy.

When the fuel cut processing is carried out at the time of deceleration of the vehicle on which the naturally aspirated gasoline engine is mounted, it is desirable, from the point of view of the deterioration of the noble metal supported by the three-way catalyst by oxidation, to suppress the amount of oxygen flowing into the three-way catalyst as much as possible in the case where the temperature of the three-way catalyst is relatively high. Accordingly, in the naturally aspirated gasoline engine according to the present disclosure, at the time of carrying out the fuel cut processing to stop the ignition by the spark plug and the fuel injection by the fuel injection valve during the operation of said gasoline engine, and in the case where the temperature of the three-way catalyst arranged in the exhaust passage is equal to or higher than the predetermined temperature (such a situation being referred to as "at the time of carrying out the fuel cut processing in the high temperature state of the three-way catalyst"), said controller included in said control apparatus for a naturally aspirated gasoline engine suppresses oxygen from flowing into the three-way catalyst at the time of carrying out the fuel cut processing in the high temperature state of the three-way catalyst as much as possible, by controlling the first throttle valve, the second throttle valve and the EGR valve.

Specifically, at the time of carrying out the fuel cut processing in the high temperature state of the three-way catalyst, said controller may open the EGR valve while fully closing the first throttle valve. As a result of this, the inflow of fresh air from the portion of the intake passage at the upstream side of the first throttle valve to a portion of the intake passage at the downstream side thereof will be stopped, and only the EGR gas having passed through the EGR passage merged or joined to the intake passage will be supplied to the interthrottle intake passage. Then, the intake air (substantially, the EGR gas) existing in the interthrottle intake passage is supplied into the cylinder through the second throttle valve. Accordingly, at this time, the EGR gas will be introduced, as intake air, into the cylinder of the naturally aspirated gasoline engine. Moreover, said controller may control the amount of the EGR gas to be sucked into the cylinder by adjusting the degree of opening of the second throttle valve. With this, the negative pressure in the intake passage at the downstream side of the second throttle valve at the time of the execution of the fuel cut processing in the high temperature state of the three-way catalyst is controlled to a desired negative pressure at which a feeling of vehicle deceleration can be obtained. In addition, in view of the fact that at this time, the EGR gas is introduced as intake air and the inflow of fresh air into the cylinder is stopped, and that intake air passes through the interior of the cylinder and is discharged into the exhaust passage as it is at the time of carrying out the fuel cut processing, in the naturally aspirated gasoline engine according to the present disclosure, the inflow of fresh air to the three-way catalyst is stopped in principle at the time of carrying out the fuel cut processing in the high temperature state of the three-way catalyst. This can suppress oxygen from flowing into the three-way catalyst as much as possible at the time of carrying out the fuel cut processing in the high temperature state of the three-way catalyst. Then, at this time, it is not necessary to make large the throttling of the second throttle valve for the purpose of suppressing the inflow of fresh air to the three-way catalyst, and hence, there is only a small possibility that a relatively large negative pressure occurs in the cylinder, so that oil rise (oil loss via the piston ring) can be suppressed.

As mentioned above, in the naturally aspirated gasoline engine according to the present disclosure, because oxygen can be suppressed from flowing into the three-way catalyst as much as possible at the time of carrying out the fuel cut processing in the high temperature state of the three-way catalyst, it becomes possible to suppress the deterioration of the noble metal supported by the three-way catalyst by oxidation, and further, the feeling of vehicle deceleration can be obtained during the execution of the fuel cut processing, and oil rise (oil loss via the piston ring) can be suppressed.

In addition, when carrying out the fuel cut processing, the controller included in the control apparatus for a naturally aspirated gasoline engine according to the present disclosure may stop the ignition of said spark plug after said first throttle valve begins to be closed, and may continue the fuel injection of said fuel injection valve until said first throttle valve is fully closed. Then, said controller may stop the ignition and the fuel injection in an intake air control state in which said first throttle valve is fully closed and said EGR valve is opened. In such a naturally aspirated gasoline engine, the ignition of the spark plug may be stopped after the first throttle valve begins to be closed and before said first throttle valve is fully closed. Moreover, in the process in which the first throttle valve is fully closed, the amount of fresh air in the intake air sucked into the cylinder will decrease, and the amount of the EGR gas therein will increase (i.e., the EGR ratio in the intake air will become higher). If the ignition of the spark plug is carried out in such a situation, there is a fear that a misfire resulting from an increase in the EGR ratio may occur. Accordingly, in said naturally aspirated gasoline engine, in such a situation, the misfire resulting from the increase in the EGR ratio becomes difficult to occur, by stopping the ignition of the spark plug in the process in which the first throttle valve is fully closed. As a result, the occurrence of variation in the torque of the naturally aspirated gasoline engine can be suppressed.

Here, in said naturally aspirated gasoline engine, although the ignition of the spark plug is stopped when the first throttle valve has not arrived at its fully closed state (i.e., when the first throttle valve opens to no small extent), the fuel injection of the fuel injection valve is continued at this time. Then, the fuel injected is discharged together with fresh air from the cylinder into the exhaust passage as it is, and flows into the three-way catalyst, without being combusted within the cylinder. Here, in the three-way catalyst, the fuel discharged from the cylinder and the oxygen contained in the fresh air discharged from the cylinder react with each other. In other words, the oxygen contained in the fresh air passing through the interior of the cylinder and flowing into the three-way catalyst while ignition has been stopped will be consumed by the fuel which passes through the interior of the cylinder and flows into the three-way catalyst, similar to said fresh air. Due to this, in the process in which the first throttle valve arrives at its fully closed state, too, the deterioration of the noble metal by oxidation resulting from the inflow of the fresh air to the three-way catalyst can be suppressed, as in the case where the first throttle valve has been made into the fully closed state. Here, note that if ignition is stopped and fuel injection is continued before the first throttle valve begins to be closed, the amount of the fresh air flowing into the three-way catalyst will become relatively large, and the amount of oxygen reacting in the three-way catalyst will also become large, as a result of which the temperature rise of the three-way catalyst resulting from the reaction of oxygen therein becomes relatively large. In contrast to this, however, in the present disclosure, ignition is stopped and fuel injection is continued in the process in which the first throttle valve is being fully closed, so the amount of the fresh air flowing into the three-way catalyst will become relatively small, and the temperature rise of the three-way catalyst resulting from the reaction of oxygen therein becomes relatively small.

Further, when carrying out the fuel cut processing, the controller included in the control apparatus for a naturally aspirated gasoline engine according to the present disclosure may stop the ignition of said spark plug after said first throttle valve begins to be closed, and may continue the fuel injection of said fuel injection valve until a first predetermined period of time has elapsed from the formation of said intake air control state. Then, said controller may stop the ignition in the intake air control state, and may stop the ignition and the fuel injection after the first predetermined period of time has elapsed from the formation of the intake air control state. In such a naturally aspirated gasoline engine, the ignition of the spark plug may be stopped after the first throttle valve begins to be closed and before said first throttle valve is fully closed.

Here, as mentioned above, in the naturally aspirated gasoline engine according to the present disclosure, at the time of carrying out the fuel cut processing in the high temperature state of the three-way catalyst, said controller stops in principle the inflow of fresh air to the three-way catalyst, by forming said intake air control state for the first throttle valve and the EGR valve. However, for some period of time after said controller forms said intake air control state for the first throttle valve and the EGR valve, the fresh air remaining in the intake passage connected with the cylinder at the downstream side of the first throttle valve (hereinafter, this may be referred to as "residual fresh air".) will be sucked into the cylinder together with the EGR gas. With this, the residual fresh air sucked into the cylinder together with the EGR gas will be discharged from the cylinder together with the EGR gas as it is, and will flow into the three-way catalyst, and hence, this is not preferable from the view point of the deterioration of the noble metal supported by the three-way catalyst by oxidation.

Accordingly, said controller included in said control apparatus for a naturally aspirated gasoline engine continues the fuel injection of the fuel injection valve for a period of time from the formation of said intake air control state for the first throttle valve and the EGR valve until the first predetermined period of time, which is a period of time in which the residual fresh air can flow into the three-way catalyst, has elapsed, so that the fuel passing through the interior of the cylinder to flow into the three-way catalyst and the oxygen contained in the residual fresh air are made to react with each other in the three-way catalyst. With this, the oxygen contained in the fresh air passing through the interior of the cylinder to flow into the three-way catalyst while ignition has been stopped will be consumed by the fuel passing through the interior of the cylinder to flow into the three-way catalyst. In other words, said control apparatus for a naturally aspirated gasoline engine can suppress the deterioration of the noble metal by oxidation resulting from the inflow of the residual fresh air to the three-way catalyst.

In addition, in the naturally aspirated gasoline engine according to the present disclosure, when returning from the fuel cut processing, the degree of opening of each throttle valve and the degree of opening of the EGR valve may be controlled, and the start time of fuel injection by the fuel injection valve and the start time of ignition by the spark plug may be controlled.

More specifically, when returning from the fuel cut processing, the controller included in the control apparatus for a naturally aspirated gasoline engine according to the present disclosure may introduce fresh air into the cylinder of said gasoline engine as intake air by opening said first throttle valve and by fully closing said EGR valve, and may further control an amount of the fresh air by adjusting the degree of opening of said second throttle valve. According to this, the inflow of the fresh air from the portion of the intake passage at the upstream side of the first throttle valve to the portion of the intake passage at the downstream side thereof is started, and the recirculation of the EGR gas from the EGR passage is stopped. Accordingly, the fresh air will be introduced into the cylinder as intake air. In addition, the pressure in the portion of the intake passage at the downstream side of the second throttle valve becomes able to be controlled by controlling the amount of the fresh air to be introduced by means of the adjustment of the opening degree of the second throttle valve. Moreover, said controller may start the fuel injection of said fuel injection valve in response to said first throttle valve beginning to be opened, and may start the ignition of said spark plug after a second predetermined period of time has elapsed from the beginning of the opening of the first throttle valve.

Here, in the naturally aspirated gasoline engine according to the present disclosure, at the time of carrying out the fuel cut processing and in the case where the temperature of the three-way catalyst arranged in the exhaust passage is equal to or higher than the predetermined temperature, i.e., at the time of carrying out the fuel cut processing in the high temperature state of the three-way catalyst, said intake air control state is formed for the first throttle valve and the EGR valve, and hence, the EGR gas is filled in the portion of the intake passage connected with the cylinder at the downstream side of the first throttle valve. Accordingly, when the first throttle valve is opened and the EGR valve is fully closed at the time of returning from the fuel cut processing, the supply of fresh air from the portion of the intake passage at the upstream side of the first throttle valve to the cylinder is started according to the beginning of opening of the first throttle valve, and the recirculation of the EGR gas from the EGR passage is stopped according to the full closure of the EGR valve, but the amount of the EGR gas to be sucked into the cylinder easily increases until the EGR gas filled in the portion of the intake passage at the downstream side of the first throttle valve is scavenged by the fresh air from the portion of the intake passage at the upstream side of the first throttle valve. Stated in another way, the amount of the EGR gas to be sucked into the cylinder easily increases until the second predetermined period of time elapses from the beginning of opening of the first throttle valve. If the ignition of the spark plug is carried out in such a situation, there is a fear that variation in torque due to a misfire will occur.

Accordingly, said controller included in said control apparatus for a naturally aspirated gasoline engine may start the ignition of the spark plug after a certain period of time has elapsed from the first throttle valve begins to be opened. That is, the ignition of the spark plug may be stopped until the second predetermined period of time has elapsed from the time when the first throttle valve begins to be opened, i.e., for a period of time until the EGR gas filled in the portion of the intake passage at the downstream side of the first throttle valve is scavenged by the fresh air from the portion of the intake passage at the upstream side of the first throttle valve. As a result, the occurrence of variation in the torque of the naturally aspirated gasoline engine can be suppressed.

Here, in said naturally aspirated gasoline engine, the fresh air supplied into the cylinder from the portion of the intake passage at the upstream side of the first throttle valve in the opening process of the first throttle valve in the period of time from the beginning of the opening of the first throttle valve until the ignition of the spark plug is started will be discharged from the cylinder to the exhaust passage as it is, without being used for combustion in the cylinder, and will flow into the three-way catalyst, thus giving rise to a fear of promoting the deterioration of the noble metal by oxidation. Accordingly, said controller may start the fuel injection of the fuel injection valve in response to the first throttle valve beginning to be opened. As a result, the fuel injected in the second predetermined period of time from the time when the first throttle valve begins to be opened until the ignition of the spark plug is started will be discharged from the cylinder to the exhaust passage as it is, and will flow into the three-way catalyst, similar to the fresh air. Then, in the three-way catalyst, this fuel reacts with the oxygen contained in the fresh air discharged from the cylinder. Consequently, the oxygen contained in the fresh air passing through the interior of the cylinder and flowing into the three-way catalyst will be consumed.

As described above, said controller included in said control apparatus for a naturally aspirated gasoline engine suppresses the occurrence of variation in the torque of the naturally aspirated gasoline engine by stopping the ignition and not performing the return until the second predetermined period of time elapses from the time when the first throttle valve begins to be opened. Moreover, at this time, the deterioration of the noble metal by oxidation resulting from the inflow of fresh air into the three-way catalyst is suppressed by carrying out fuel injection to cause the oxygen contained in the fresh air, which passes through the interior of the cylinder and flows into the three-way catalyst, to be consumed.

According to the present disclosure, in a naturally aspirated gasoline engine, it is able to suppress a noble metal supported by a three-way catalyst from being deteriorated by oxidation with the execution of fuel cut processing in a suitable manner.

BRIEF DESCRIPTION OF DRAWINGS

FIG. 1 is a diagram showing the general configuration of a naturally aspirated gasoline engine and its intake and exhaust systems according to an embodiment of the present disclosure.

FIG. 2 is a diagram showing a low load region, a middle load region and a high load region, as a load region to which an operating state of the naturally aspirated gasoline engine shown in FIG. 1 belongs, as well as showing an EGR operating region in which the supply of an EGR gas is carried out.

FIG. 3 is a diagram showing an operating state of the naturally aspirated gasoline engine in the case of shifting from a normal operation to an execution of fuel cut processing, together with the operating regions shown in FIG. 2.

FIG. 4A is a first diagram showing a time chart in the case where fuel cut processing according to a first embodiment of the present disclosure is carried out.

FIG. 4B is a second diagram showing a time chart in the case where the fuel cut processing according to the first embodiment of the present disclosure is carried out.

FIG. 5 is a flow chart showing a control flow which is executed by a controller included in a control apparatus for a naturally aspirated gasoline engine according to the first embodiment of the present disclosure.

FIG. 6 is a diagram showing the general configuration of a naturally aspirated gasoline engine according to a modification of the present disclosure.

FIG. 7 is a diagram showing a time chart in the case where fuel cut processing according to the modification of the present disclosure is carried out.

FIG. 8 is a diagram showing a time chart in the case where fuel cut processing according to a second embodiment of the present disclosure is carried out.

FIG. 9 is a diagram showing an operating state of a naturally aspirated gasoline engine in the case of return processing from fuel cut processing according to a third embodiment of the present disclosure, together with the operating regions shown in FIG. 2.

FIG. 10 is a diagram showing a time chart in the case where the return processing according to the third embodiment of the present disclosure is carried out.

FIG. 11 is a flow chart showing a control flow which is executed by a controller included in a control apparatus for a naturally aspirated gasoline engine according to the third embodiment of the present disclosure.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless particularly stated.

Embodiment 1

First, reference will be made to a first embodiment of the present disclosure based on FIGS. 1 through 5. FIG. 1 is a diagram showing the general configuration of a naturally aspirated gasoline engine (hereinafter, referred to simply as a "gasoline engine") 1 to which the present disclosure is applied. The gasoline engine 1 is a spark ignition internal combustion engine of a cylinder injection type for driving a vehicle, and is provided with a spark plug 15 and a fuel injection valve 16. The gasoline engine 1 has an intake system which is constructed so as to be able to perform natural aspiration. Specifically, in an intake passage 10 connected to a cylinder of the gasoline engine 1 at the downstream side of an air cleaner 2, there are arranged a first throttle valve 3, a surge tank 4, and a second throttle valve 5 in this order along the flow of intake air. The surge tank 4 has an intake air space of a prescribed capacity, in order to utilize intake air pulsation in an effective manner with respect to the supply of intake air into the cylinder. Here, note that the second throttle valve 5 is arranged at the immediately upstream side of an intake branch pipe (intake manifold) 12 of the gasoline engine 1.

In addition, with an exhaust system of the gasoline engine 1, an exhaust gas purification catalyst in the form of a three-way catalyst 6 is arranged in the exhaust passage 11 connected to the cylinder of the gasoline engine 1. Then, an unillustrated noble metal is supported by the three-way catalyst 6. Moreover, an EGR passage 13 is connected at its one end to the exhaust passage 11 at the downstream side of the three-way catalyst 6, and is further connected at its other end to the intake passage 10 at a merge portion 14 between the first throttle valve 3 and the surge tank 4. A part of the exhaust gas flowing through the exhaust passage 11 is recirculated as an EGR gas into the intake passage 10 through this EGR passage 13. Further, in the EGR passage 13, there are arranged an EGR cooler 7 for cooling the EGR gas, and an EGR valve 8 for controlling the flow rate of the recirculating EGR gas (hereinafter, sometimes referred to as an "EGR amount") along the flow of recirculation of the EGR gas. An EGR device 9 is formed of the EGR passage 13, the EGR cooler 7 and the EGR valve 8. Here, note that in FIG. 1, the EGR passage 13 is connected to the exhaust passage 11 at the downstream side of the three-way catalyst 6, but instead of this, the EGR passage 13 may be connected to the exhaust passage 11 at the upstream side of the three-way catalyst 6.

Then, an ECU 20, being an electronic control unit, is mounted in the gasoline engine 1, and performs various kinds of control in the gasoline engine 1. In addition, in the gasoline engine 1, an accelerator opening sensor 21 is electrically connected to the ECU 20, so that the ECU 20 receives a signal corresponding to an accelerator opening degree, and calculates therefrom an engine load required of the gasoline engine 1, etc. In addition, a crank position sensor 22 is electrically connected to the ECU 20, so that the ECU 20 receives a signal corresponding to a rotation angle of an output shaft of the gasoline engine 1, and calculates an engine rotation speed of the gasoline engine 1, etc. Moreover, the ECU 20 is also electrically connected to an air flow meter 23 arranged in the intake passage 10, and can detect a flow rate of fresh air flowing through the intake passage 10 (hereinafter, also sometimes referred to as a "fresh air flow rate"). Further, the ECU 20 is also electrically connected to an exhaust gas temperature sensor 17 which is arranged at the downstream side of the three-way catalyst 6 in the exhaust passage 11, so that the ECU 20 receives a signal corresponding to a temperature of the exhaust gas, and estimates a temperature of the three-way catalyst 6 (hereinafter, also sometimes referred to as a "catalyst temperature").

Moreover, a variety of kinds of equipment such as the first throttle valve 3, the second throttle valve 5, the EGR valve 8, the spark plug 15, the fuel injection valve 16, and so on are electrically connected to the ECU 20. Then, the degree of opening of the first throttle valve 3, the degree of opening of the second throttle valve 5, the ignition timing of the spark plug 15, the amount of fuel injection from the fuel injection valve 16, the fuel injection timing in the gasoline engine 1, etc., are controlled by the ECU 20, and other various kinds of control in the gasoline engine 1 is carried out. For example, the ECU 20 controls the amount of fuel injection from the fuel injection valve 16 so that the air fuel ratio of a mixture in the cylinder of the gasoline engine 1 becomes a stoichiometric air fuel ratio or an air fuel ratio in the vicinity thereof at the time of normal operation.

Here, in the gasoline engine 1, the supply of the fresh air and the EGR gas to the cylinder is carried out according to the operating state of the engine. Such a supply of the fresh air and the EGR gas will be explained below based on FIG. 2. Here, note that the operating state of the gasoline engine 1 is specified according to the engine load and the engine rotation speed thereof. FIG. 2 shows a load region into which the operating state of the gasoline engine 1 falls, by classifying it into a low load region R1, a middle load region R2, and a high load region R3. The low load region R1 is the lowest load region in the entire load region; the high load region R3 is the highest load region in the entire load region; and the middle load region R2 is located between the low load region R1 and the high load region R3. Here, note that, in principle, the higher the engine load of the gasoline engine 1, the more the amount of the fresh air to be supplied into the cylinder increases.

Further, with the gasoline engine 1, for improvement of fuel consumption or improvement of emissions, the recirculation of the EGR gas to the intake passage 10 by the EGR device 9 is carried out corresponding to the operating state of the gasoline engine 1. Accordingly, in FIG. 2, an EGR operating region R5 in which the recirculation of the EGR gas by the EGR device 9 is carried out is shown overlapped on the above-mentioned individual load regions. Specifically, although the EGR operating region R5 is set across the low load region R1, the middle load region R2 and the high load region R3, it can be understood from FIG. 2 that the EGR operating region R5 does not extend to a low load side in the low load region R1 and to a high load side in the high load region R3. Here, note that the amount of the EGR gas to be supplied into the cylinder in the EGR operating region R5 is adjusted to an amount necessary in order to achieve an EGR ratio required according to the operating state of the gasoline engine 1.

Then, when the operating state of the gasoline engine 1 falls in the low load region R1, i.e., at the time of the low load region, while keeping the first throttle valve 3 at the upstream side in the intake passage 10 fully open, the degree of opening of the second throttle valve 5 at the downstream side is adjusted to a degree of opening corresponding to the fresh air flow rate for achieving the required operating state of the engine. Accordingly, a negative pressure formed in the intake passage 10 between the first throttle valve 3 and the second throttle valve 5 containing the surge tank 4 is relatively small, and substantially, a relatively large negative pressure will be formed in the intake branch pipe (intake manifold) 12 at the downstream side of the second throttle valve 5.

We will discuss the control of EGR gas with the above-describe throttle control. At this time, the first throttle valve 3 is put into a fully opened state, and so, the negative pressure becomes relatively small in the merge portion 14 of the EGR passage 13 and the intake passage 10, as mentioned above. For that reason, a pressure difference between the upstream side and the downstream side of the EGR valve 8 arranged in the EGR passage 13 (hereinafter, sometimes referred to as a "pressure difference across the EGR valve 8") becomes small, so it becomes possible to control the EGR amount by adjustment of the opening degree of the EGR valve 8 with a high degree of accuracy.

In addition, when the operating state of the gasoline engine 1 falls in the high load region R3, while keeping the second throttle valve 5 fully open, the degree of opening of the first throttle valve 3 is adjusted to a degree of opening corresponding to the fresh air flow rate for achieving the required operating state of the engine. Then, when the operating state of the gasoline engine 1 falls in the middle load region R2, the degree of opening of the first throttle valve 3 is adjusted so as to become smaller than the full opening degree, and then, the fresh air flow rate is controlled by the degree of opening of the second throttle valve 5 being adjusted.

We will discuss the control of EGR gas with the above-describe throttle control. When the operating state of the gasoline engine 1 falls in the high load region R3, the EGR amount is controlled by the EGR valve 8. Then, when the operating state of the gasoline engine 1 falls in the middle load region R2, the EGR amount will be substantially controlled by the first throttle valve 3. This is because the pressure difference across the EGR valve 8, which affects the EGR amount, can be controlled by adjusting the degree of opening of the first throttle valve 3.

Moreover, with the gasoline engine 1, at the time of deceleration of the gasoline engine 1 (this may also be at the time of deceleration of the vehicle), the fuel injection by the fuel injection valve 16 is stopped and the ignition by the spark plug 15 is stopped by means of the ECU 20 during the operation of the gasoline engine 1. That is, "fuel cut processing" is carried out by the ECU 20. Then, the fuel cut processing is carried out, for example, when the accelerator opening degree is zero, and when the engine rotation speed is more than a predetermined rotation speed. Also, with the gasoline engine 1, when the engine rotation speed of the gasoline engine 1 becomes equal to or less than a predetermined speed during the execution of the fuel cut processing, or when the accelerator opening degree is made larger than zero by the operation of the driver, the fuel injection by the fuel injection valve 16 is started and the ignition by the spark plug 15 is started by means of the ECU 20. That is, "return processing" is carried out.

When the fuel cut processing is carried out by the ECU 20, fresh air will pass through the interior of the cylinder, and will flow into the three-way catalyst 6, as mentioned above. In this case, the noble metal supported by the three-way catalyst 6 will contact the oxygen contained in the fresh air. Then, when the fuel cut processing is carried out in a state where the catalyst temperature is relatively high, there is a fear that the noble metal supported by the three-way catalyst 6 will be deteriorated by oxidation.

Accordingly, when there is a fear that the noble metal may be deteriorate by oxidation, i.e., when the catalyst temperature is equal to or higher than a predetermined temperature, while carrying out the fuel cut processing, the ECU 20, which is a controller included in a control apparatus for the gasoline engine 1 according to this embodiment, introduces the EGR gas as intake air into the cylinder of the gasoline engine 1 by fully closing the first throttle valve 3 and opening the EGR valve 8, and controls the amount of the EGR gas further by adjusting the degree of opening of the second throttle valve 5. Hereinafter, the above-mentioned control is referred to as "intake air control at the time of fuel cut". In addition, control in which the first throttle valve 3 is fully closed and the EGR valve 8 is opened by the ECU 20 for intake air control at the time of fuel cut is referred to as "intake air control", and a state in which the first throttle valve 3 is fully closed and the EGR valve 8 is opened by the intake air control is referred to as an "intake air control state". Here, the above-mentioned predetermined temperature is defined as a catalyst temperature at which when fresh air flows into the three-way catalyst 6 and the noble metal supported by the three-way catalyst 6 contacts the oxygen contained in the fresh air, the noble metal can be deteriorated by oxidation. Then, the predetermined temperature has been decided in advance based on experiments, etc., and has been stored in a ROM of the ECU 20. For example, in this embodiment, the predetermined temperature is set to 750 degrees C.

Then, during the execution of the intake air control at the time of fuel cut, the inflow of fresh air from a portion of the intake passage 10 at the upstream side of the first throttle valve 3 to a portion of the intake passage 10 at the downstream side of the first throttle valve 3 is stopped, and only the EGR gas passing through the EGR passage 13, which merges with the intake passage at the merge portion 14, will be supplied to a portion of the intake passage 10 between the first throttle valve 3 and the second throttle valve 5. Accordingly, the EGR gas will be introduced, as intake air, into the cylinder of the gasoline engine 1. In other words, the intake air control at the time of fuel cut stops, in principle, fresh air passing through the interior of the cylinder of the gasoline engine 1 to flow into the three-way catalyst 6 during the execution of the fuel cut processing, thereby suppressing the inflow of oxygen to the three-way catalyst 6. In this way, it is possible to suppress the deterioration of the noble metal by oxidation resulting from the inflow of the fresh air to the three-way catalyst 6.

Here, the fuel cut processing carried out by the controller included in the control apparatus for the gasoline engine 1 according to this embodiment will be explained by using the operating state of the gasoline engine 1 shown in FIG. 3 and time charts shown in FIG. 4A and FIG. 4B. FIG. 3 is a diagram showing the operating state of the gasoline engine 1 in the case of shifting from the normal operation to the execution of the fuel cut processing, together with the operating regions shown in FIG. 2. In FIG. 3, a fuel cut execution region R4 where the fuel cut processing is carried out is shown together with the operating regions shown in FIG. 2. In addition, a point A shown in FIG. 3 represents the operating state of the gasoline engine 1 corresponding to a time point t0 in time charts to be described later; a point B represents the operating state of the gasoline engine 1 corresponding to a time point t1 in the time charts to be described later; and a point C represents the operating state of the gasoline engine 1 corresponding to a time point t3 in the time charts to be described later, respectively. Then, FIG. 4A and FIG. 4B are diagrams showing the time charts when the fuel cut processing according to this embodiment is carried out. In FIG. 4A, there are shown the changes over time of the accelerator opening degree, a fuel cut processing request flag, a fuel injection stop flag, an ignition permission flag, the degree of opening of the first throttle valve 3, the degree of opening of the second throttle valve 5, and the degree of opening of the EGR valve 8 in a process in which the gasoline engine 1 is slowed down or decelerated. In addition, in FIG. 4B, there are shown the changes over time of the pressure difference across the EGR valve 8, the pressure in the intake passage 10 at the downstream side of the second throttle valve 5 (hereinafter, sometimes referred to as a "second throttle valve downstream pressure"), the EGR amount, and the concentration of oxygen in the intake passage 10 between the first throttle valve 3 and the second throttle valve 5 (hereinafter, simply referred to as an "oxygen concentration"), in the process of the gasoline engine 1 being slowed down, and for the purpose of explanation of these changes over time, there are also shown the changes over time of the degree of opening of the first throttle valve 3, the degree of opening of the second throttle valve 5, and the degree of opening of the EGR valve 8 shown in FIG. 4A At the time point t0 shown in FIG. 4A, the gasoline engine 1 carries out normal operation, and the operating state of the gasoline engine 1 at this time is represented by the point A shown in FIG. 3. Then, as shown in FIG. 4A, in the process in which the accelerator opening degree is made smaller to decelerate the gasoline engine 1, the gasoline engine 1 slows down by the degree of opening of the second throttle valve 5 being made smaller according to the decreasing accelerator opening degree. In this case, the operating state of the gasoline engine 1 is shifted from the high load region R3 to the low load region R1 through the middle load range R2, and at the time of the low load region, the control of the amount of intake air is carried out by the second throttle valve 5, and the degree of opening of the first throttle valve 3 is controlled so as to be fully opened. Also, in this case, the degree of opening of the EGR valve 8 is made smaller according to the decreasing degree of opening of the second throttle valve 5. Then, the accelerator opening degree is made smaller, and when the accelerator opening degree is made to be fully closed at the time point t1, the operating state of the gasoline engine 1 will be in the operating state represented by the point B shown in FIG. 3. At this time, the operating state of the gasoline engine 1 represented by the point B does not fall in the EGR operating region R5, as shown in FIG. 3, so at the time point t1, the EGR valve 8 is made to be fully closed, as shown in FIG. 4A, and the EGR amount becomes zero, as shown in FIG. 4B. Here, note that these control is normal control carried out at the time of the normal operation of the gasoline engine 1. Then, at the time point t1 at which the accelerator opening degree is fully closed, the fuel cut processing request flag is set to 1. Here, the fuel cut processing request flag is a flag which is set to 1 in the case where there is a request for fuel cut processing (hereinafter, sometimes referred to as a "fuel cut processing request"), and which is set to 0 in the case where there is no fuel cut processing request.

Then, when the fuel cut processing request flag is set to 1 in the case where the catalyst temperature is equal to or higher than the predetermined temperature, the intake air control will be started. In the intake air control, in order to form the intake air control state for the first throttle valve 3 and the EGR valve 8, the control of the first throttle valve 3 and the EGR valve 8 is started before the execution of the fuel cut processing. Here, in the control processing shown in FIG. 4A, at the time point t1, the control to fully open the EGR valve 8 is started, and at the time point t2, the EGR valve 8 is fully opened. At this time, in order to suppress the amount of the EGR gas sucked into the cylinder of the gasoline engine 1 from being increased steeply, as well as the variation of torque due to misfire from occurring, the first throttle valve 3 is maintained in a fully opened state from the time point t1 to the time point t2. As a result, as shown in FIG. 4B, the pressure difference across the EGR valve 8 does not in general change from the time point t1 to the time point t2. Then, the EGR amount, which changes according to the pressure difference across the EGR valve 8 and the degree of opening of the EGR valve 8, increases gradually from the time point t1 to the time point t2, as shown in FIG. 4B. As a result, the occurrence of torque variation due to misfire can be suppressed. In addition, accompanying the EGR amount gradually increasing from the time point t1 to the time point t2, the oxygen concentration gradually decreases from the time point t1 to the time point t2, as shown in FIG. 4B. Here, note that these control is carried out before the execution of the fuel cut processing, as mentioned above, so at this time, the fuel injection by the fuel injection valve 16 and the ignition by the spark plug 15 are carried out, and the oxygen contained in the fresh air is combusted within the cylinder of the gasoline engine 1.

Further, in the control processing shown in FIG. 4A, at the time point t2, the control to fully close the first throttle valve 3 is started, and at the time point t3, the first throttle valve 3 is fully closed. That is, at the time point t3, the intake air control state is formed for the first throttle valve 3 and the EGR valve 8. At this time, as shown in FIG. 4B, from the time point t2 to the time point t3, the pressure difference across the EGR valve 8 increases, and the EGR amount increases in accordance with the increase in the pressure difference across the EGR valve 8. In addition, the oxygen concentration decreases from the time point t2 to the time point t3, and when the first throttle valve 3 is fully closed at the time point t3, the oxygen concentration will be in a state where it becomes greatly lower in comparison with that at the time of the start of the intake air control (i.e., the time point t1).

Here, the control carried out from the time point t1 to the time point t3 will be explained based on FIG. 3. As described above, when the accelerator opening degree is made to be fully closed at the time point t1, the operating state of the gasoline engine 1 will be in the operating state represented by the point B shown in FIG. 3. Then, at this time, the fuel cut processing request flag is set to 1, and a fuel cut processing request is satisfied. From the time point t1 to the time point t3, the fuel injection by the fuel injection valve 16 and the ignition by the spark plug 15 are carried out, and the engine load and the engine rotation speed are controlled by the adjustment of the opening degree of the second throttle valve 5. Then, when the intake air control state is formed for the first throttle valve 3 and the EGR valve 8 at the time point t3, the operating state of the gasoline engine 1 becomes the operating state represented by the point C shown in FIG. 3.

Further, the control carried out after the time point t3, i.e., the intake air control at the time of fuel cut, will be explained based on FIG. 4A and FIG. 4B. As shown in FIG. 4A, at the time point t3, the fuel injection stop flag is set to 1, and the ignition permission flag is set to 0, so that the fuel injection by the fuel injection valve 16 and the ignition by the spark plug 15 are stopped. That is, the fuel cut processing is carried out. Then, after the time point t3 shown in FIG. 4A, the execution of fuel cut processing is being carried out, and further, the intake air control state is formed for the first throttle valve 3 and the EGR valve 8, so that the EGR gas is introduced as intake air into the cylinder of the gasoline engine 1. Further, the amount of the EGR gas to be sucked into the cylinder of the gasoline engine 1 is controlled by adjusting the degree of opening of the second throttle valve 5. In other words, the intake air control at the time of fuel cut is carried out. Here, the fuel injection stop flag is set to 1 in the case where the stop of the fuel injection by the fuel injection valve 16 is carried out, whereas it is set to 0 in the case where the stop of the fuel injection by the fuel injection valve 16 is not carried out, and it is initialized to 0 at the time of starting of the gasoline engine 1. Moreover, the ignition permission flag is set to 1 in the case where the ignition by the spark plug 15 is permitted, whereas it is set to 0 in the case where the ignition by the spark plug 15 is not permitted, and it is initialized to 1 at the time of starting of the gasoline engine 1. Also, as shown in FIG. 4B, after the time point t3, second throttle valve downstream pressure is controlled to be lower than the atmospheric pressure by the intake air control at the time of fuel cut. Further, as shown in FIG. 4B, after the time point t3, the oxygen concentration is made relatively low by the intake air control at the time of fuel cut, so that the inflow of oxygen to the three-way catalyst 6 is decreased to a large extent.

As described above, the control apparatus for the gasoline engine 1 according to this embodiment can suppress the inflow of oxygen to the three-way catalyst 6 as much as possible by carrying out the intake air control at the time of fuel cut, thereby making it possible to suppress the deterioration of the noble metal supported by the three-way catalyst 6 by oxidation in a suitable manner. In addition, during the intake air control at the time of fuel cut being carried out, second throttle valve downstream pressure is controlled to be a desired negative pressure at which a feeling of deceleration of the vehicle can be obtained by the adjustment of the opening degree of the second throttle valve 5. At this time, the pressure in the cylinder of the gasoline engine 1 does not become an excessive negative pressure. With this, the feeling of deceleration of the vehicle can be secured, and at the same time, oil rise (oil loss via the piston ring) can be suppressed.

Here, a control flow to be carried out by the controller included in the control apparatus for the gasoline engine 1 according to this embodiment will be explained based on FIG. 5. FIG. 5 is a flow chart showing the control flow according to the fuel cut processing in the control apparatus for the gasoline engine 1 according to this embodiment. In this embodiment, this flow is carried out in a repeated manner by the ECU 20 in a predetermined operation period during the operation of the gasoline engine 1. Here, the setting of the fuel cut processing request flag Nflfc is carried out by the ECU 20 according to a well-known flow which is different from this flow, and the value of the fuel cut processing request flag Nflfc is stored in the ROM of the ECU 20.

In this flow, first, in step S101, it is determined whether the fuel cut processing request flag Nflfc is 1. In step S101, the value of the fuel cut processing request flag Nflfc, which has been set according to the well-known flow different from this flow and stored in the ROM of the ECU 20, is read in, and the above-mentioned determination is made. When an affirmative determination is made in step S101, i.e., when there is a fuel cut processing request, the ECU 20 goes to the processing of step S102, and when a negative determination is made in step S101, i.e., when there is no fuel cut processing request, the execution of this flow is terminated.

When an affirmative determination is made in step S101, in step S102, the retard control of ignition timing is carried out. In the control of step S102, by retarding the ignition timing of the spark plug 15, the torque generated by the gasoline engine 1 is decreased, thus making it possible to suppress a torque step which will be generated when the fuel cut processing is actually carried out.

Then, in step S103, the catalyst temperature Tc is calculated. In step S103, a catalyst temperature Tc is calculated based on an output signal of the exhaust gas temperature sensor 17. Here, in the calculation of the catalyst temperature Tc, it may not be based on the exhaust gas temperature sensor 17, but the catalyst temperature Tc may be calculated based on the engine rotation speed and the engine load. The correlation of the catalyst temperature Tc, and the engine rotation speed and the engine load has been stored in advance in the ROM of the ECU 20 as a map or a function. In step S103, the catalyst temperature Tc may be calculated based on this correlation.

Subsequently, in step S104, it is determined whether the catalyst temperature Tc calculated in step S103 is equal to or higher than a determination threshold value Tcth. This determination threshold value Tcth is the above-mentioned predetermined temperature, and it has been decided in advance based on experiments, etc., and has been stored in the ROM of the ECU 20. When an affirmative determination is made in step S104, the ECU 20 goes to the processing of step S105, whereas when a negative determination is made in step S104, the ECU 20 goes to the processing of step S109.

When an affirmative determination is made in step S104, in step S105, the intake air control is started. In step S105, the control to form the intake air control state for the first throttle valve 3 and the EGR valve 8 is started. Subsequently, in step S106, it is determined whether the intake air control state has been formed for the first throttle valve 3 and the EGR valve 8. When an affirmative determination is made in step S106, the ECU 20 goes to the processing of step S107, whereas when a negative determination is made in step S106, the ECU 20 repeats the processing of step S106.

When an affirmative determination is made in step S106, in step S107, the ignition by the spark plug 15 and the fuel injection by the fuel injection valve 16 are stopped, and the fuel cut processing is carried out. Then, at this time, the intake air control at the time of fuel cut is carried out, so by means of the intake air control at the time of fuel cut, the EGR gas is introduced into the cylinder of the gasoline engine 1 as intake air, and the amount of the EGR gas is controlled by adjusting the degree of opening of the second throttle valve 5. That is, the inflow of oxygen to the three-way catalyst 6 is suppressed as much as possible, and at the same time, second throttle valve downstream pressure is controlled to be a desired negative pressure at which a feeling of deceleration of the vehicle can be obtained.

Then, after the processing of step S107, it is determined in step S108 whether the fuel cut processing request flag Nflfc is 0. In step S108, the value of the fuel cut processing request flag Nflfc, which has been set according to the well-known flow different from this flow during the execution of this flow and stored in the ROM of the ECU 20, is read in, and the above-mentioned determination is made. When a negative determination is made in step S108, i.e., when there is a fuel cut processing request, the ECU 20 repeats the processing of step S108.

When an affirmative determination is made in step S108, i.e., when there is no fuel cut processing request, the ECU 20 goes to first return processing. Here, note that this first return processing will be described later.

In addition, when a negative determination is made in step S104, in step S109, conventional control is started. In step S109, in a state where the first throttle valve 3 was fully opened and the EGR valve 8 was fully closed, the ignition by the spark plug 15 and the fuel injection by the fuel injection valve 16 are stopped, and the fuel cut processing is carried out. That is, the fuel cut processing is carried out in a state where the first throttle valve 3 was fully opened and the EGR valve 8 was fully closed, at the time of the low load region before the execution of fuel cut processing (i.e., a state at the time point t1 shown in the above-mentioned FIG. 4A).

Then, after the processing of step S109, it is determined in step S110 whether the fuel cut processing request flag Nflfc is 0. The processing of step S110 is substantially the same as the processing of step S108. Thus, when a negative determination is made in the processing of step S110, the ECU 20 carries out the processing of the step S110 in a repeated manner.

When an affirmative determination is made in step S110, the ECU 20 goes to second return processing. This second return processing is return processing based on a conventional technology, unlike the above-mentioned first return processing. That is, in the second return processing, it is not necessary to scavenge the EGR gas as in the first return processing to be described later, so ignition is started with the start of fuel injection.

By carrying out the intake air control at the time of fuel cut in the above-mentioned control flow, the deterioration of the noble metal supported on the three-way catalyst 6 by oxidation is suppressed. In addition, the feeling of deceleration of the vehicle can be secured, and at the same time, oil rise (oil loss via the piston ring) can be suppressed.

Modification 1

In the following, a modification of the present disclosure will be explained by using drawings. FIG. 6 is a diagram showing the general configuration of the gasoline engine 1 according to this modification. Here, note that in this modification, the detailed explanation of substantially the same configuration as in the above-mentioned FIG. 1 and substantially the same control processing as in the above-mentioned FIG. 5 is omitted.

The gasoline engine 1 according to this modification is provided with two recirculation paths for the EGR gas to be recirculated to the intake passage 10. A recirculation path formed of a first EGR passage 13A, an EGR cooler 7 and a first EGR valve 8A, which are substantially the same configuration as a recirculation path formed of the EGR passage 13, the EGR cooler 7 and the EGR valve 8 shown in the above-mentioned FIG. 1, are referred to as a first EGR path. In addition, a recirculation path, which is formed of a second EGR passage 13B connected at its one end to an exhaust passage 11 at the downstream side of a three-way catalyst 6 and further connected at its other end to an intake passage 10 at a merge portion 14 and a second EGR valve 8B arranged in the second EGR passage 13B, is referred to as a second EGR path. An EGR device 9 according to this modification is formed of the first EGR passage 13A, the second EGR passage 13B, the EGR cooler 7, the first EGR valve 8A and the second EGR valve 8B.

Then, a controller included in a control apparatus for the gasoline engine 1 according to this modification carries out intake air control at the time of fuel cut, in principle, according to the control flow shown in FIG. 5, similar to the above-mentioned first embodiment. However, the controller included in the control apparatus for the gasoline engine 1 according to this modification forms an intake air control state for the first throttle valve 3 and the second EGR valve 8B in the intake air control. In the following, the fuel cut processing carried out by the controller included in the control apparatus for the gasoline engine 1 according to this modification will be explained in detail by using a time chart shown in FIG. 7.

In FIG. 7, there are shown the changes over time of a fuel cut processing request flag, a fuel injection stop flag, an ignition permission flag, the degree of opening of the first throttle valve 3, the degree of opening of the second throttle valve 5, the degree of opening of the first EGR valve 8A and the degree of opening of the second EGR valve 8B in a process in which the gasoline engine 1 is slowed down or decelerated. Here, note that the changes over time of a fuel cut processing request flag, a fuel injection stop flag, an ignition permission flag, the degree of opening of the first throttle valve 3, the degree of opening of the second throttle valve 5, shown in FIG. 7, are the same as those shown in the above-mentioned FIG. 4A.

In the control processing shown in FIG. 7, similar to the above-mentioned FIG. 4A, the operating state of the gasoline engine 1 is shifted from the high load region R3 to the low load region R1 through the middle load range R2, from the time point t0 to the time point t1. In addition, in this modification, when the operating state of the gasoline engine 1 falls in the high load region R3, the first EGR valve 8A is opened, and the second EGR valve 8B is fully closed. That is, the recirculation of the EGR gas, which is recirculated to the intake passage 10 through the first EGR path (hereinafter, sometimes referred to as a "first EGR gas"), is being carried out, and the recirculation of the EGR gas, which is recirculated to the intake passage 10 through the second EGR path (hereinafter, sometimes referred to as a "second EGR gas"), is being stopped. Then, at the time point t1 at which the operating state of the gasoline engine 1 falls out of the EGR operating region R5 shown in the above-mentioned FIG. 3, the first EGR valve 8A is made to be fully closed. Here, note that these control is normal control carried out at the time of the normal operation of the gasoline engine 1. In addition, the first EGR valve 8A remains fully closed after the time point t1. Then, the intake air control is started when the fuel cut processing request flag is set to 1 at the time point t1, and at the time point t1, the control to fully open the second EGR valve 8B is started, and at the time point t2, the second EGR valve 8 is fully opened. The control apparatus for the gasoline engine 1 according to this modification can suppress the deterioration of the noble metal supported by the three-way catalyst 6 by oxidation, by carrying out the fuel cut processing, too, as mentioned above.

Here, when the gas temperature of the EGR gas drops in the intake passage 10 at the downstream side of the first throttle valve 3, there is a fear that condensed water may be generated in the intake passage 10 resulting from the EGR gas. The controller included in the control apparatus of the gasoline engine 1 according to this modification recirculates the EGR gas through the second EGR path (second EGR gas) without passing the EGR cooler 7, while stopping the recirculation of the first EGR gas cooled by the EGR cooler 7, during the execution of the intake air control at the time of fuel cut, as a result of which the gas temperature of the EGR gas in the intake passage 10 at the downstream side of the first throttle valve 3 becomes relatively more difficult to drop. Thus, the generation of condensed water in the intake passage 10 resulting from the EGR gas can be suppressed.

Embodiment 2

Next, reference will be made to a second embodiment of the present disclosure based on FIG. 8. Here, the detailed explanation of substantially the same configuration and substantially the same control processing as in the above-mentioned first embodiment is omitted.

In the above-mentioned first embodiment, the intake air control is carried out so that the intake air control state is formed for the first throttle valve 3 and the EGR valve 8, whereby the EGR gas will be introduced, in principle, into the cylinder of the gasoline engine 1. However, in a process in which the first throttle valve 3 is made to be fully closed in accordance with the start of the intake air control (i.e., in a period from the time point t2 to the time point t3 indicated in the above-mentioned FIG. 4A), fresh air will be contained in the intake air sucked into the cylinder (see the oxygen concentration in a period from the time point t2 to the time point t3 indicated in the above-mentioned FIG. 4B). Moreover, in the process in which the first throttle valve 3 is fully closed, the amount of fresh air in the intake air sucked into the cylinder will decrease, and the amount of the EGR gas will increase (i.e., the EGR ratio in the intake air will become higher). If the ignition of the spark plug 15 is carried out in such a situation, there is a fear that a misfire resulting from an increase in the EGR ratio may occur. In addition, until a first predetermined period of time elapses after the intake air control state was formed for the first throttle valve 3 and the EGR valve 8, the fresh air remaining in the intake passage 10 at the downstream side of the first throttle valve 3 (hereinafter, sometimes referred to as "residual fresh air") will be sucked into the cylinder together with the EGR gas. At this time, the residual fresh air sucked into the cylinder together with the EGR gas will be discharged from the cylinder together with the EGR gas as it is, and will flow into the three-way catalyst 6, and hence, this is not preferable from the view point of the deterioration of the noble metal supported by the three-way catalyst 6 by oxidation.

Accordingly, the controller included in the control apparatus for the gasoline engine 1 according to this second embodiment stops the ignition by the spark plug 15 in a situation where the EGR ratio becomes higher in the process in which the above-mentioned first throttle valve 3 is made to be fully closed. Then, until the first predetermined period of time elapses after the intake air control state was formed for the first throttle valve 3 and the EGR valve 8, i.e., until a period elapses in which the residual fresh air can flow into the three-way catalyst 6 after the intake air control state was formed, the fuel injection of the fuel injection valve 16 is continued, so that the fuel passing through the interior of the cylinder to flow into the three-way catalyst 6 and the oxygen contained in the residual fresh air are made to react with each other in the three-way catalyst 6. In the following, the fuel cut processing carried out by the controller included in the control apparatus for the gasoline engine 1 according to this second embodiment will be explained in detail by using a time chart shown in FIG. 8.

In FIG. 8, similar to FIG. 4A, there are shown the changes over time of the accelerator opening degree, a fuel cut processing request flag, a fuel injection stop flag, an ignition permission flag, the degree of opening of the first throttle valve 3, the degree of opening of the second throttle valve 5, and the degree of opening of the EGR valve 8 in a process in which the gasoline engine 1 is slowed down or decelerated. Here, note that the time chart shown in FIG. 8 is the same in the changes over time thereof until the time point t2 as that shown in the above-mentioned FIG. 4A, but is different therefrom in the ignition stop timing and the fuel injection stop timing after the time point t2.

In the control processing shown in FIG. 8, at a time point t23 at which a period of time $\Delta t3$, which is a third predetermined period of time, has elapsed from the time point t2 at which the first throttle valve 3 begins to be closed, the ignition permission flag is set to 0 and the ignition by the spark plug 15 is stopped. Stated in another way, the ignition by the spark plug 15 has been continued until the period of time $\Delta t3$ has elapsed from the time point t2. Here, the above-mentioned third predetermined period of time is an arbitrary period of time which is less than a period of time from the time the first throttle valve 3 begins to be closed, until it is made to be fully closed. Then, in the process in which the first throttle valve 3 is made to be fully closed (i.e., a period of time from the time point t2 to the time point t3), the amount of fresh air in the intake air sucked into the cylinder is decreasing, and the amount of the EGR gas therein is increasing, wherein after the time point t23 at which the period of time $\Delta t3$ has elapsed from the time point t2, when the ignition of the spark plug 15 is carried out, there is a fear that a misfire resulting from an increase in the EGR ratio may occur. For this reason, in the control processing shown in FIG. 8, the ignition is stopped at the time point t23. As a result of this, the occurrence of variation in the torque of the gasoline engine 1 is suppressed.

Here, in the control processing shown in FIG. 8, similar to the above-mentioned FIG. 4A, the first throttle valve 3 is fully closed at the time point t3. That is, at the time point t3, the intake air control state is formed for the first throttle valve 3 and the EGR valve 8. At this time, in the above-mentioned first embodiment, as shown in the above-mentioned FIG. 4A, at the time point t3, the fuel injection stop flag is set to 1, and the fuel injection by the fuel injection valve 16 is stopped. In contrast to this, the controller included in the control apparatus for the gasoline engine 1 according to this second embodiment continues the fuel injection until a time point t4, without stopping the fuel injection by the fuel injection valve 16 at the time point t3. Here, the time point t4 is a time point at which the period of time $\Delta t1$, i.e., the first predetermined period of time, has elapsed from the time point t3 at which the intake air control state is formed for the first throttle valve 3 and the EGR valve 8. Thus, in the control processing shown in FIG. 8, fuel injection is continued until the time point t4, so in a period of time from the time point t23 to the time point t4, ignition will be stopped and only fuel injection will be continued. In the following, the operation and effect due to the ignition being stopped and only the fuel injection being continued will be explained.

First, from the time point t23 to the time point t3, the first throttle valve 3 is in a process of being fully closed, and the first throttle valve 3 is opened to not a small extent, and hence, fresh air is supplied from the intake passage 10 at the upstream side of the first throttle valve 3, and is sucked into the cylinder of the gasoline engine 1. Because the ignition by the spark plug 15 has been stopped at this time, the fresh air sucked into the cylinder is discharged from the cylinder into the exhaust passage 11 as it is, without being used for combustion within the cylinder, and flows into the three-way catalyst 6. On the other hand, the fuel injected by the fuel injection valve 16 in the period of time from the time point t23 to the time point t3 is also discharged from the cylinder into the exhaust passage 11 as it is, without being used for combustion within the cylinder, and flows into the three-way catalyst 6. As a result, in the three-way catalyst 6, the fuel passing through the interior of the cylinder of the gasoline engine 1 to flow into the three-way catalyst 6 (hereinafter, sometimes referred to as "passed fuel"), and the oxygen contained in the fresh air passing through the interior of the cylinder of the gasoline engine 1 to flow into the three-way catalyst 6 (hereinafter, sometimes referred to as "passed fresh air") react with each other.

Subsequently, the period of time from the time point t3 to the time point t4 is a period of time in which the above-mentioned residual fresh air, i.e., the fresh air remaining in the intake passage 10, an intake branch pipe (intake manifold) 12 and an intake port at the downstream side of the first throttle valve 3 (hereinafter, sometimes referred to as a "first throttle valve downstream side intake arrangement"), will be sucked into the cylinder of the gasoline engine 1 together with the EGR gas. Here, note that the time point t4 is a time point at which the period $\Delta t1$, being the first predetermined period of time, has elapsed from the time point t3, as mentioned above. Here, explaining the first predetermined period of time in detail, the above-mentioned first predetermined period of time is a period of time after the intake air control state was formed for the first throttle valve 3 and the EGR valve 8 until the residual fresh air is sucked into the cylinder of the gasoline engine 1 so that the fresh air in the first throttle valve downstream side intake arrangement becomes mostly zero. Then, the above-mentioned first predetermined period of time has a correlation with the volume of the first throttle valve downstream side intake arrangement, wherein for example, in cases where the residual fresh air becomes mostly zero when the gasoline engine 1 performs three intake strokes after the intake air control state was formed for the first throttle valve 3 and the EGR valve 8, the first predetermined period of time is set to a period of time corresponding to this operating cycle. Then, the first predetermined period of time is stored in the ROM of the ECU 20 as a predetermined value, a map or a function.

Then, from the time point t3 to the time point t4, similar to the situation from the time point t23 to the time point t3, the residual fresh air sucked into the cylinder is discharged from the cylinder into the exhaust passage 11 as it is, without being used for combustion within the cylinder, and flows into the three-way catalyst 6. As a result, in the three-way catalyst 6, the passed fuel, which has been injected in a period from the time point t3 to the time point t4 and passed through the interior of the cylinder of the gasoline engine 1, and the oxygen contained in the residual fresh air passing through the interior of the cylinder to flow into the three-way catalyst 6 (hereinafter, sometimes referred to as "passed residual fresh air") react with each other. Here, note that the operating state of the gasoline engine 1 at the time point t4 shown in FIG. 8 becomes the operating state represented by the point C shown in the above-mentioned FIG. 3. Then, after the time point t4, the intake air control at the time of fuel cut is carried out.

Here, the amount of fuel injection injected from the fuel injection valve 16 is controlled in principle so that the air fuel ratio of the mixture in the cylinder of the gasoline engine 1 becomes the stoichiometric air fuel ratio. Accordingly, as the fresh air flow rate is decreasing, the amount of fuel injection from the fuel injection valve 16 is also decreasing. Then, in the period from the time point t23 to the time point t4 in which the ignition by the spark plug 15 is stopped, the amount of fuel injection will be set with respect to the fresh air which is not used for combustion within the cylinder, i.e., the passed fresh air, or the passed residual fresh air. In such a case, the controller included in the control apparatus for the gasoline engine 1 according to this second embodiment may set the amount of fuel injection to an air fuel ratio richer than the stoichiometric air fuel ratio. With this, the oxygen contained in the passed fresh air or the passed residual fresh air can be consumed as soon as possible. In addition, the amount of the passed fresh air or the passed residual fresh air flowing into the three-way catalyst 6 is relatively small, so the amount of oxygen reacting in the three-way catalyst 6 also becomes small, and the rise of the catalyst temperature resulting from the reaction becomes relatively small.

The control apparatus for the gasoline engine 1 according to this second embodiment can suppress the inflow of oxygen to the three-way catalyst 6 as much as possible by carrying out the above-mentioned control, thereby making it possible to suppress the deterioration of the noble metal supported by the three-way catalyst 6 by oxidation. Here, note that the above-mentioned explanation is for an example in which ignition is stopped in a period of time from the time the first throttle valve 3 begins to be closed until it is fully closed, and in which fuel injection is stopped after the first predetermined period of time has elapsed after the intake air control state was formed for the first throttle valve 3 and the EGR valve 8. In this second embodiment, ignition may be stopped in the period of time from the time the first throttle valve 3 begins to be closed until it is fully closed, and fuel injection may be stopped in response to the formation of the intake air control state for the first throttle valve 3 and the EGR valve 8. In addition, in this second embodiment, ignition is stopped in response to the formation of the intake air control state for the first throttle valve 3 and the EGR valve 8, and fuel injection may be stopped after the first predetermined period of time has elapsed after the intake air control state was formed. The control apparatus for the gasoline engine 1 according to this second modification can suppress the deterioration of the noble metal supported by the three-way catalyst 6 by oxidation, by carrying out such control processing, too.

Embodiment 3

Next, reference will be made to a third embodiment of the present disclosure based on FIGS. 9 through 11. Here, the detailed explanation of substantially the same configuration and substantially the same control processing as in the above-mentioned first embodiment is omitted.

The above-mentioned first and second embodiments are examples in which fuel cut processing is carried out. In contrast to this, this third embodiment is an example in which the above-mentioned first return processing is carried out which is return processing from the fuel cut processing according to the present disclosure in which the above-mentioned intake air control at the time of fuel cut is carried out.

When the engine rotation speed of the gasoline engine 1 becomes equal to or less than a predetermined speed during the execution of the fuel cut processing, return processing is carried out for avoidance of engine stall, etc. Hereinafter, this control is referred to as "natural return control". On the other hand, while carrying out the fuel cut processing, the return processing is also carried out when the accelerator opening degree is made larger than zero by an operation of the driver. Hereinafter, this control is referred to as "forced return control".

Here, the operating state of the gasoline engine 1 at the time when the return processing is carried out will be explained by using FIG. 9. FIG. 9 is a diagram showing the operating state of the gasoline engine 1 in the case of the first return processing from the fuel cut processing according to the third embodiment of the present disclosure in which the above-mentioned intake air control at the time of fuel cut is carried out, together with the operating regions shown in FIG. 2. A point D shown in FIG. 9 represents the operating state of the gasoline engine 1 when the engine rotation speed is the above-mentioned predetermined speed during the execution of the intake air control at the time of fuel cut. Then, when the operating state of the gasoline engine 1 becomes the operating state represented by the point D, the natural return control is carried out. As a result, the operating state of the gasoline engine 1 becomes the operating state represented by the point E. At this time, there is no torque request for the gasoline engine 1, so the amount of fresh air which begins to be sucked into the cylinder of the gasoline engine 1 becomes relatively small. On the other hand, a point D' shown in FIG. 9 represents the operating state at the time when the forced return control is started. Then, when the forced return control is carried out, the operating state of the gasoline engine 1 becomes the operating state represented by a point E'. At this time, there is a torque request for the gasoline engine 1, so the amount of fresh air which begins to be sucked into the cylinder of the gasoline engine 1 becomes relatively large.

Moreover, as mentioned above, when the intake air control at the time of fuel cut is carried out, the inflow of fresh air from a portion of the intake passage 10 at the upstream side of the first throttle valve 3 to a portion of the intake passage 10 at the downstream side of the first throttle valve 3 is stopped, and the EGR gas is filled in the first throttle valve downstream side intake arrangement. When the first return processing is carried out in such a state, the amount of fresh air in the intake air sucked into the cylinder easily becomes small, and the amount of EGR gas easily becomes large, as a result of which torque variation due to misfire may occur. This is because upon carrying out the first return processing, the first throttle valve 3 fully closed until then is made to be opened, but the amount of the EGR gas to be sucked into the cylinder of the gasoline engine 1 easily becomes large, until the EGR gas filled in the first throttle valve downstream side intake arrangement is scavenged by the fresh air from the portion of the intake passage 10 at the upstream side of the first throttle valve 3. Then, in cases where there is no torque request for the gasoline engine 1, and where the natural return control is carried out in which the amount of the fresh air to begin to be sucked into the cylinder of the gasoline engine 1 becomes relatively small, in particular, scavenging of the EGR gas by the fresh air becomes slow, thus giving rise to a situation that the torque variation due to misfire becomes easy to occur. In the following, the natural return control to be performed by the controller included in the control apparatus for the gasoline engine 1 according to this third embodiment will be explained in detail by using a time chart shown in FIG. 10.

In FIG. 10, there are shown the changes over time of the accelerator opening degree, a fuel cut processing request flag, a fuel injection stop flag, an ignition permission flag, the degree of opening of the first throttle valve 3, the degree of opening of the second throttle valve 5, and the degree of opening of the EGR valve 8, for the natural return control to be carried out by the controller included in the control apparatus for the gasoline engine 1 according to this third embodiment. Here, at a time point t5 shown in FIG. 10, the intake air control at the time of fuel cut is carried out. Then, at a time point t6 which is defined as a time point at which the engine rotation speed becomes the above-mentioned predetermined speed, the fuel cut processing request flag is set to 0. Here, note that the operating state of the gasoline engine 1 at the time point t6 shown in FIG. 10 is represented by the point D shown in the above-mentioned FIG. 9.

Then, at the time point t6 at which the fuel cut processing request flag is set to 0, the first throttle valve 3 is started to be opened, and at the same time, the EGR valve 8 is started to be closed, and at a time point t7, the first throttle valve 3 is fully opened, and at the same time, the EGR valve 8 is fully closed. In the following explanation, control in which during the execution of the intake air control at the time of fuel cut, the fuel cut processing request disappears and the first throttle valve 3 is fully opened, and the EGR valve 8 is fully closed, as mentioned above, is referred to as "intake air control at the time of return". By carrying out the intake air control at the time of return, the controller included in the control apparatus for the gasoline engine 1 according to this third embodiment starts the supply of the fresh air from the intake passage 10 at the upstream side of the first throttle valve 3, and at the same time stops the recirculation of the EGR gas from the EGR passage 13 to the intake passage 10 as soon as possible, thereby introducing the fresh air into the cylinder of the gasoline engine 1 in principle as intake air. Further, at this time, the controller controls the amount of the EGR gas by adjusting the degree of opening of the second throttle valve 5. In addition, in the control processing shown in FIG. 10, in response to the first throttle valve 3 beginning to be opened, the fuel injection stop flag is set to 0 and the fuel injection by the fuel injection valve 16 is started, at the time point t6.

Further, in the control processing shown in FIG. 10, at a time point t8 at which a period of time Δt2, which is a second predetermined period of time, has elapsed from the time point t6 at which the first throttle valve 3 begins to be opened, the ignition permission flag is set to 1 and the ignition by the spark plug 15 is started. That is, the first return processing is carried out. Here, note that by carrying out the first return processing, the operating state of the gasoline engine 1 becomes the operating state represented by the point E shown in the above-mentioned FIG. 9. Here, the above-mentioned second predetermined period of time is a period of time from the time the first throttle valve 3 begins to be opened, until the EGR gas filled in the first throttle valve downstream side intake arrangement becomes almost 0, and has a correlation with the volume of the first throttle valve downstream side intake arrangement. Then, the second predetermined period of time is stored in the ROM of the ECU 20 as a predetermined value, a map or a function. In addition, as mentioned above, the amount of the fresh air in the intake air to be sucked into the cylinder of the gasoline engine 1 easily becomes small and the amount of the EGR gas therein easily becomes large, until the EGR gas filled in the first throttle valve downstream side intake arrangement is scavenged by the fresh air from the portion of the intake passage 10 at the upstream side of the first throttle valve 3, i.e., from the time point t6 to the time point t8. If the ignition of the spark plug 15 is carried out in such a situation, there is a fear that a misfire resulting from an increase in the EGR ratio may occur. Accordingly, the control apparatus for the gasoline engine 1 according to this third embodiment can suppress the occurrence of torque variation in the gasoline engine 1 by stopping the ignition of the mixture in the cylinder of the gasoline engine 1 by the spark plug 15 in the period of time from the time point t6 until the time point t8 in which the gasoline engine 1 is in such a state.

Here, in the control processing shown in FIG. 10, ignition will be stopped and only fuel injection will be continued, in a period of time from the time point t6 to the time point t8. At this time, by means of the intake air control at the time of return, fresh air is supplied from the intake passage 10 at the upstream side of the first throttle valve 3, and is sucked into the cylinder of the gasoline engine 1. Then, the fresh air sucked into the cylinder is discharged from the cylinder into the exhaust passage 11 as it is, without being used for combustion within the cylinder, and flows into the three-way catalyst 6. On the other hand, the fuel injected by the fuel injection valve 16 in the period of time from the time point t6 to the time point t8 is also discharged from the cylinder into the exhaust passage 11 as it is, without being used for combustion within the cylinder, and flows into the three-way catalyst 6. As a result, in the three-way catalyst 6, the passed fuel reacts with the oxygen contained in the passed fresh air. Here, note that the amount of fuel injection at this time may be set to a rich air fuel ratio richer than the stoichiometric air fuel ratio. With this, the oxygen contained in the passed fresh air can be consumed as soon as possible.

Here, note that in the control processing shown in FIG. 10, from the time point t5 to the time point t8, the second throttle valve downstream pressure can be made to be controlled by the adjustment of the opening degree of the second throttle valve 5. In addition, the controller included in the control apparatus for the gasoline engine 1 according to this third embodiment carries out the above-mentioned ordinary operation control at the time of the low load region after the time point t8 at which the first return processing is carried out.

The control apparatus for the gasoline engine 1 according to this third embodiment can suppress the inflow of oxygen to the three-way catalyst 6 as much as possible by carrying out the above-mentioned control, thereby making it possible to suppress the deterioration of the noble metal supported by the three-way catalyst 6 by oxidation.

Here, a control flow to be carried out by the controller included in the control apparatus for the gasoline engine 1 according to this third embodiment will be explained based on FIG. 11. FIG. 11 is a flow chart showing the control flow according to the first return processing in the control apparatus for the gasoline engine 1 according to this third embodiment. In this third embodiment, this flow or routine is carried out by means of the ECU 20.

In this flow, first, in step S301, the intake air control at the time of return and the fuel injection by the fuel injection valve 16 are started. In step S301, the control to fully open the first throttle valve 3 as well as to fully close the EGR valve 8 is started, and the fuel injection by the fuel injection valve 16 is started. Due to the processing of step S301 being carried out, the supply of the fresh air from the portion of the intake passage 10 at the upstream side of the first throttle valve 3 is started, and the recirculation of the EGR gas from the EGR passage 13 to the intake passage 10 is stopped. With this, fresh air is in principle introduced into the cylinder of the gasoline engine 1 as intake air, and further, at this time, the amount of the fresh air is controlled by adjusting the degree of opening of the second throttle valve 5.

Subsequently, in step S302, it is determined whether the second predetermined period of time has elapsed after the first throttle valve 3 begins to be opened. Here, this second predetermined period of time is a period of time until the EGR gas filled in the first throttle valve downstream side intake arrangement becomes almost 0, as mentioned above, and has been stored in the ECU 20 in advance. When an affirmative determination is made in step S302, the ECU 20 goes to the processing of step S303, whereas when a negative determination is made in step S302, the ECU 20 repeats the processing of step S302.

When an affirmative determination is made in step S302, the ignition by the spark plug 15 is started in step S303. In step S303, ignition timing retard control is carried out together, and a torque step accompanying the start of ignition is suppressed. Then, after the processing of step S303, the execution of this flow is ended.

When the control according to the return processing is carried out as in the above-mentioned control flow, the oxygen contained in the passed fresh air reacts with the passed fuel in the three-way catalyst 6, until the ignition by the spark plug 15 is started after the second predetermined period of time has elapsed from the time when the first throttle valve 3 begins to be opened. As a result, the oxygen contained in the passed fresh air can be consumed, while suppressing the occurrence of variation in the torque of the gasoline engine 1, whereby it becomes possible to suppress the deterioration of the noble metal by oxidation resulting from the inflow of the fresh air to the three-way catalyst 6.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control apparatus for a naturally aspirated gasoline engine comprising:
   a three-way catalyst that is arranged in an exhaust passage of said gasoline engine;
   a first throttle valve that is arranged in an intake passage of said gasoline engine;
   a second throttle valve that is arranged in said intake passage at the downstream side of said first throttle valve;
   an EGR device including an EGR passage that recirculates an EGR gas, which is a part of an exhaust gas discharged from said gasoline engine, to said intake passage between said first throttle valve and said second throttle valve, and an EGR valve that is arranged in said EGR passage; and
   a controller comprising at least one processor configured to carry out fuel cut processing, which is processing to stop ignition by a spark plug and fuel injection by a fuel injection valve during operation of said gasoline engine,
   wherein in cases where said controller carries out said fuel cut processing and where a temperature of said three-way catalyst is equal to or higher than a predetermined temperature, said controller introduces said EGR gas into a cylinder of said gasoline engine as intake air by fully closing said first throttle valve and by opening said EGR valve, and further controls an amount of said EGR gas by adjusting a degree of opening of said second throttle valve.

2. The control apparatus for a naturally aspirated gasoline engine according to claim 1, wherein
   when said controller carries out said fuel cut processing, said controller stops the ignition of said spark plug after said first throttle valve begins to be closed, continues the fuel injection of said fuel injection valve until said first throttle valve is fully closed, and stops the ignition and the fuel injection in an intake air control state in which said first throttle valve is fully closed and said EGR valve is opened.

3. The control apparatus for a naturally aspirated gasoline engine according to claim 1, wherein
   when said controller carries out said fuel cut processing, said controller stops the ignition of said spark plug after said first throttle valve begins to be closed, still stops the ignition in an intake air control state in which said first throttle valve is fully closed and said EGR valve is opened, continues the fuel injection of said fuel injection valve until a first predetermined period of time has elapsed from the time when said intake air control state is formed, and stops the ignition and the fuel injection after said first predetermined period of time has elapsed from the time when said intake air control state is formed.

4. The control apparatus for a naturally aspirated gasoline engine according to claim 1, wherein
   when said controller returns from said fuel cut processing, said controller introduces fresh air into the cylinder of said gasoline engine as intake air by opening said first throttle valve and by fully closing said EGR valve, further controls an amount of the fresh air by adjusting the degree of opening of said second throttle valve, starts the fuel injection of said fuel injection valve in response to when said first throttle valve begins to be opened, and starts the ignition of said spark plug after a second predetermined period of time has elapsed from the time when said first throttle valve begins to be opened.

5. The control apparatus for a naturally aspirated gasoline engine according to claim 2, wherein
when said controller returns from said fuel cut processing, said controller introduces fresh air into the cylinder of said gasoline engine as intake air by opening said first throttle valve and by fully closing said EGR valve, further controls an amount of the fresh air by adjusting the degree of opening of said second throttle valve, starts the fuel injection of said fuel injection valve in response to when said first throttle valve begins to be opened, and starts the ignition of said spark plug after a second predetermined period of time has elapsed from the time when said first throttle valve begins to be opened.

6. The control apparatus for a naturally aspirated gasoline engine according to claim 3, wherein
when said controller returns from said fuel cut processing, said controller introduces fresh air into the cylinder of said gasoline engine as intake air by opening said first throttle valve and by fully closing said EGR valve, further controls an amount of the fresh air by adjusting the degree of opening of said second throttle valve, starts the fuel injection of said fuel injection valve in response to when said first throttle valve begins to be opened, and starts the ignition of said spark plug after a second predetermined period of time has elapsed from the time when said first throttle valve begins to be opened.

* * * * *